United States Patent [19]

Yasuda et al.

[11] Patent Number: 5,054,103

[45] Date of Patent: Oct. 1, 1991

[54] PICTURE ENCODING SYSTEM

[75] Inventors: Akira Yasuda; Hiroyoshi Yuasa; Satoshi Furukawa; Nobuo Matsuo; Hisataka Fujii; Masami Hisada; Yoshihiko Tokunaga; Tadashi Satake, all of Kadoma; Hiroshi Hamada, Okayama; Yoshitaka Morikawa, Okayama; Nobumoto Yamane, Okayama, all of Japan

[73] Assignee: Matsushita Electric Works, Ltd., Japan

[21] Appl. No.: 248,915

[22] Filed: Sep. 22, 1988

[30] Foreign Application Priority Data

Sep. 24, 1987 [JP] Japan .................................. 62-240453
Sep. 24, 1987 [JP] Japan .................................. 62-240454
Sep. 24, 1987 [JP] Japan .................................. 62-240455

[51] Int. Cl.⁵ .............................................. G06K 9/36
[52] U.S. Cl. .................................. 382/56; 358/261.2; 364/725; 382/43
[58] Field of Search ........................... 382/56, 43, 54; 358/261.2, 133, 135; 375/27, 122; 364/725, 726, 826, 827

[56] References Cited

U.S. PATENT DOCUMENTS

| 4,215,375 | 7/1980 | Usubuchi et al. ................. 358/261.2 |
| 4,394,774 | 7/1983 | Widergren et al. .................... 382/56 |
| 4,533,957 | 8/1985 | Iinuma ............................ 358/261.2 |
| 4,698,689 | 10/1987 | Tzou ................................. 382/56 |
| 4,703,349 | 10/1987 | Bernstein ............................ 382/56 |
| 4,841,464 | 6/1989 | Guichard et al. .................... 364/725 |
| 4,870,695 | 9/1989 | Gonzales et al. ...................... 382/56 |
| 4,897,717 | 1/1990 | Hamilton et al. ................... 375/122 |

FOREIGN PATENT DOCUMENTS

| 3545106 | 12/1985 | Fed. Rep. of Germany . |
| 62-240453 | 9/1987 | Japan . |
| 62-240454 | 9/1987 | Japan . |
| 62-240455 | 9/1987 | Japan . |
| 62-288003 | 11/1987 | Japan . |
| 63-73664 | 3/1988 | Japan . |

OTHER PUBLICATIONS

"Recursive Block Coding-A New Approach to Transform Coding": IEEE Transactions on Communications, Paul M. Farrelle and Anil K. Jain; vol. Com. 34, No. 2, Feb. 1986.

Yamane et al., "An Image Data Compression Method Using Two-Dimensional Extrapolative Prediction-Discrete Sine Transform", Oct. 29-31, 1986, pp. 311-316.

Chen et al., "Adaptive Coding of Monochrome and Color Images", Nov. 1977, pp. 1285-1292.

O'Neal et al., "Coding Isotropic Images", Nov. 1977, pp. 697-707.

Primary Examiner—David K. Moore
Assistant Examiner—Joseph Mancuso
Attorney, Agent, or Firm—Leydig, Voit & Mayer

[57] ABSTRACT

A picture encoding system which performs a prediction of picture element values within a block having a plurality of picture elements into which an original picture is divided, a discrete sine transform with respect to prediction error signals for obtaining a transform coefficient, a quantization of the transform coefficient for encoding quantized indexes, an inverse quantization of the quantized indexes for reproduction of the transform coefficient, an inverse discrete sine transform of the reproduced coefficient to reproduce the prediction error signal, and an addition thereto of the predicted picture element value for reproducing the picture element values within the block to employ them in predicting a next stage block to be encoded, whereby the block can be minimized in size while simplifying required transform operation.

18 Claims, 23 Drawing Sheets

Fig. 4
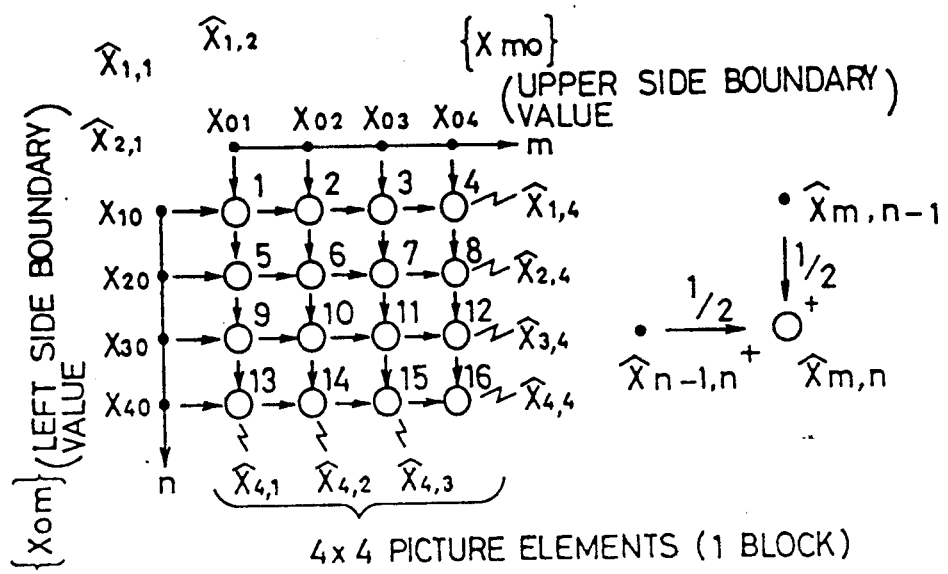
4×4 PICTURE ELEMENTS (1 BLOCK)
Fig. 5
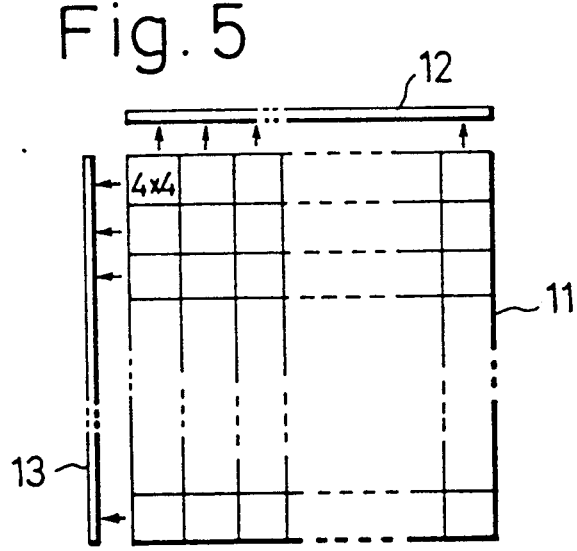
Fig. 6a   Fig. 6b   Fig. 6c
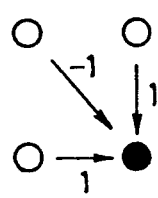 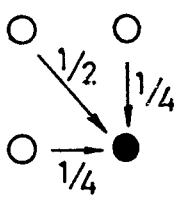 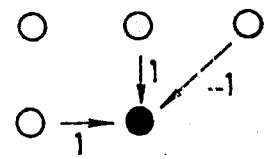

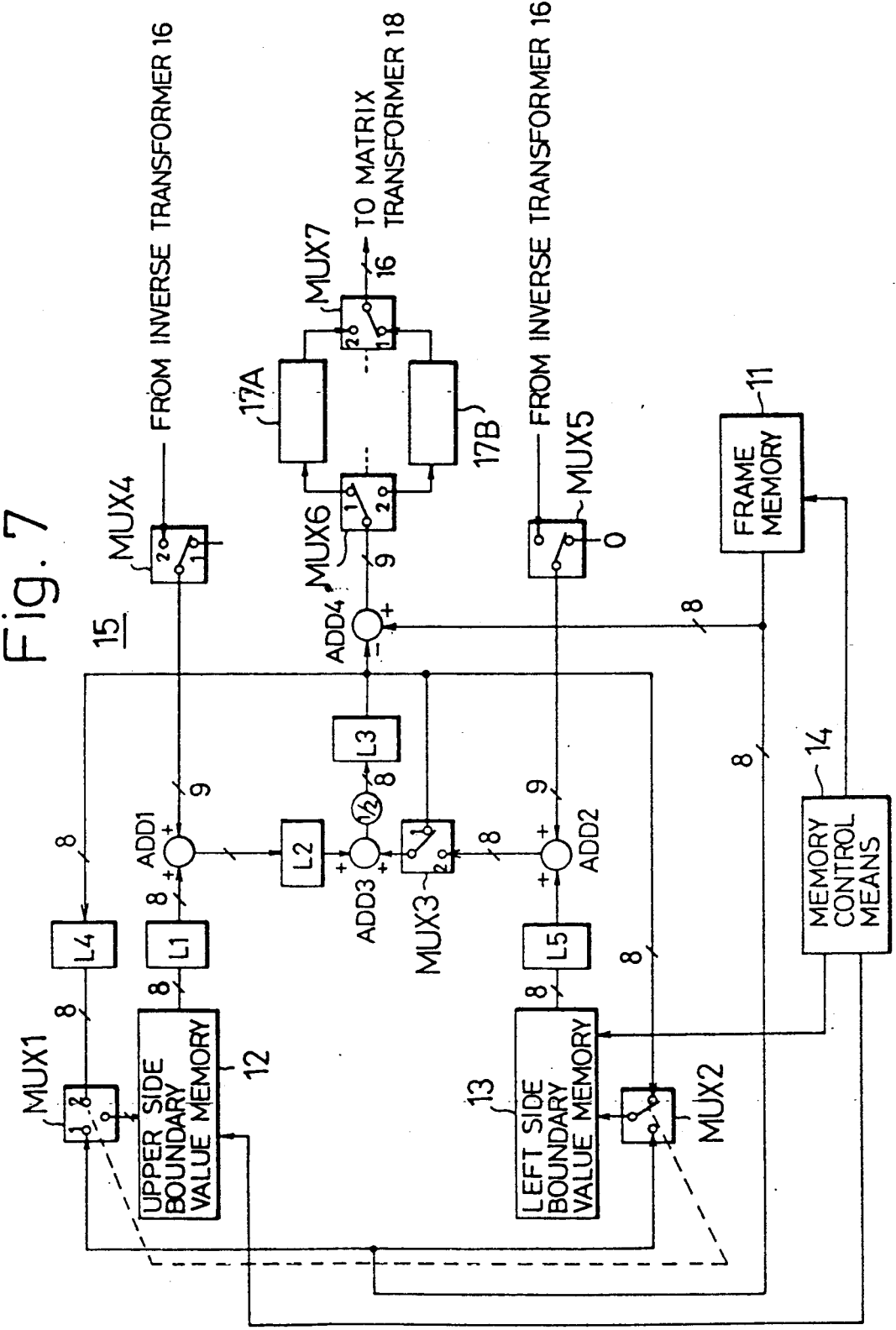

OUTPUT 4×4

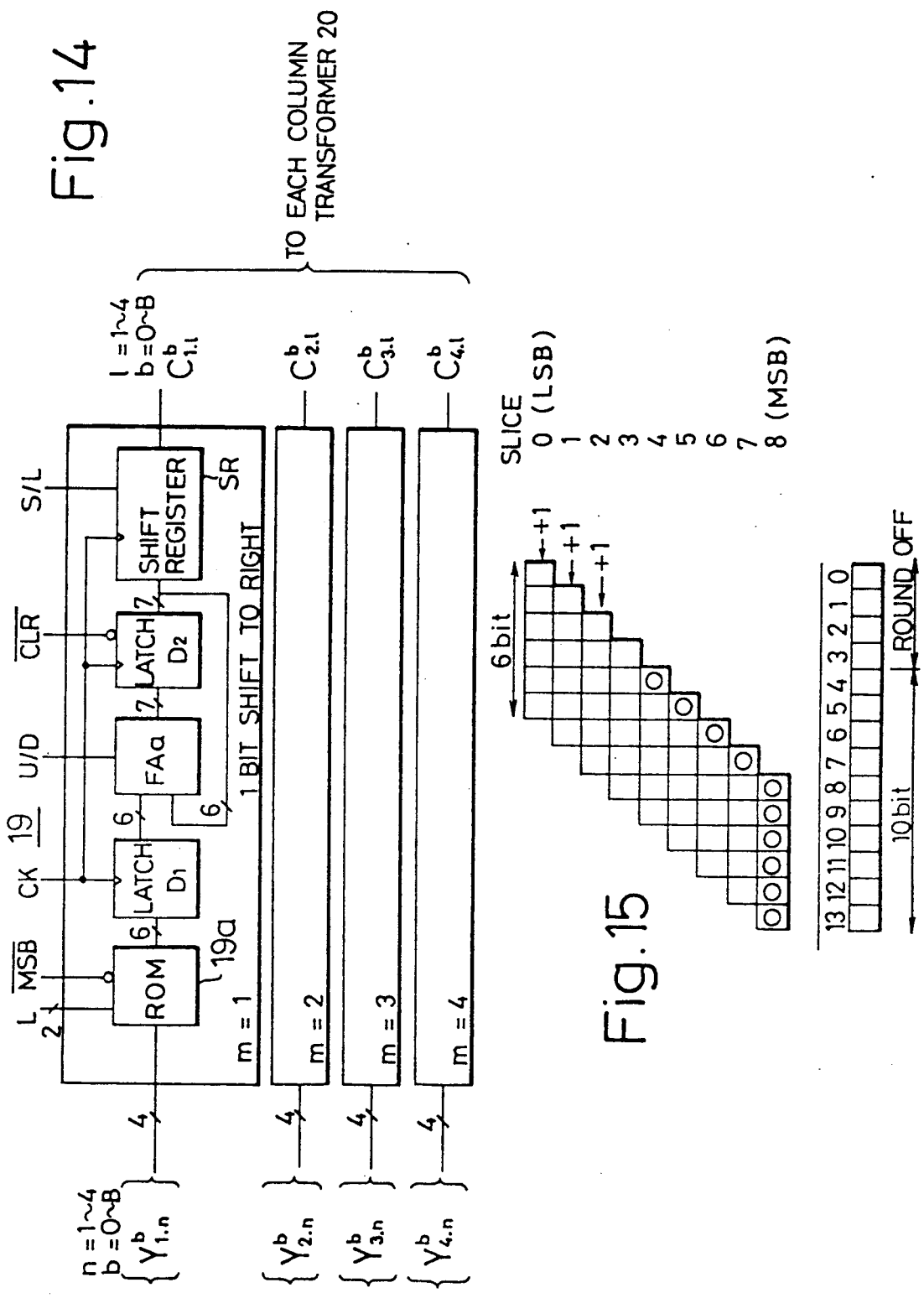

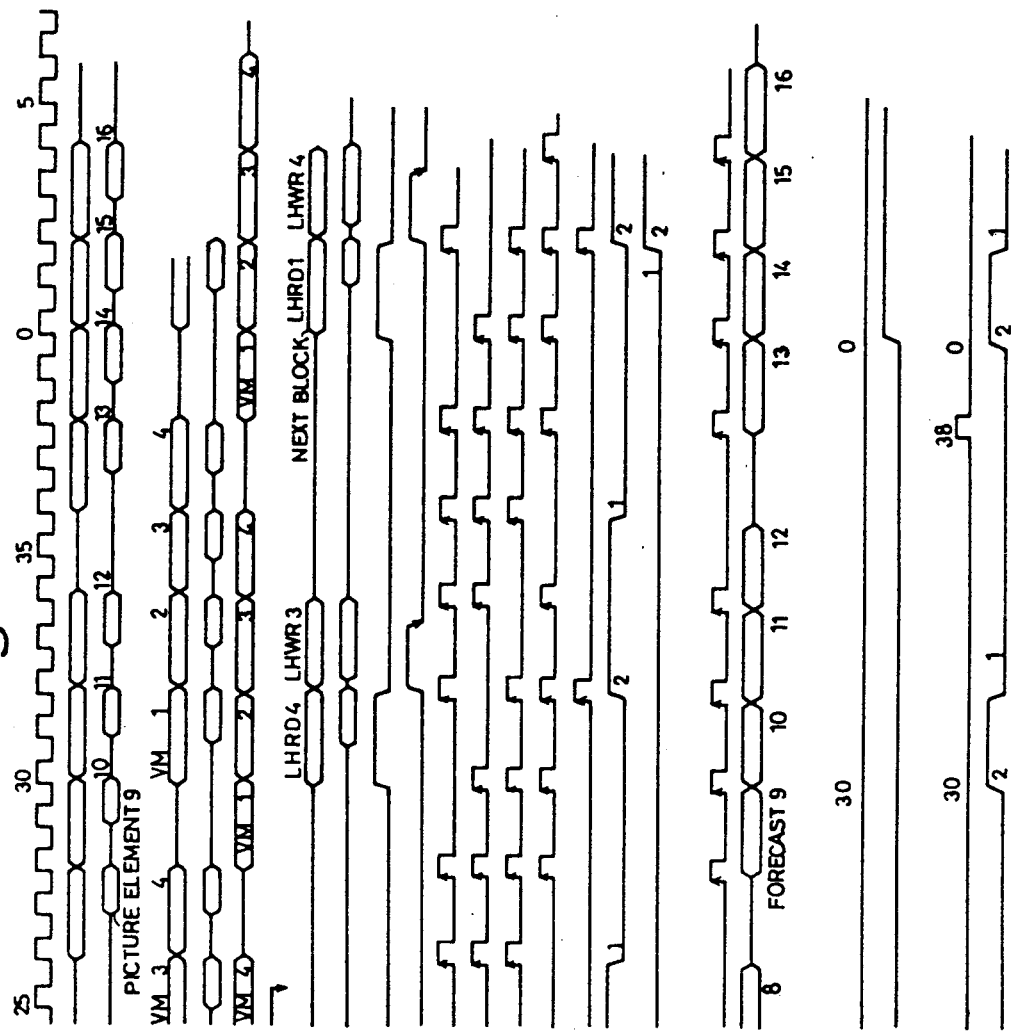

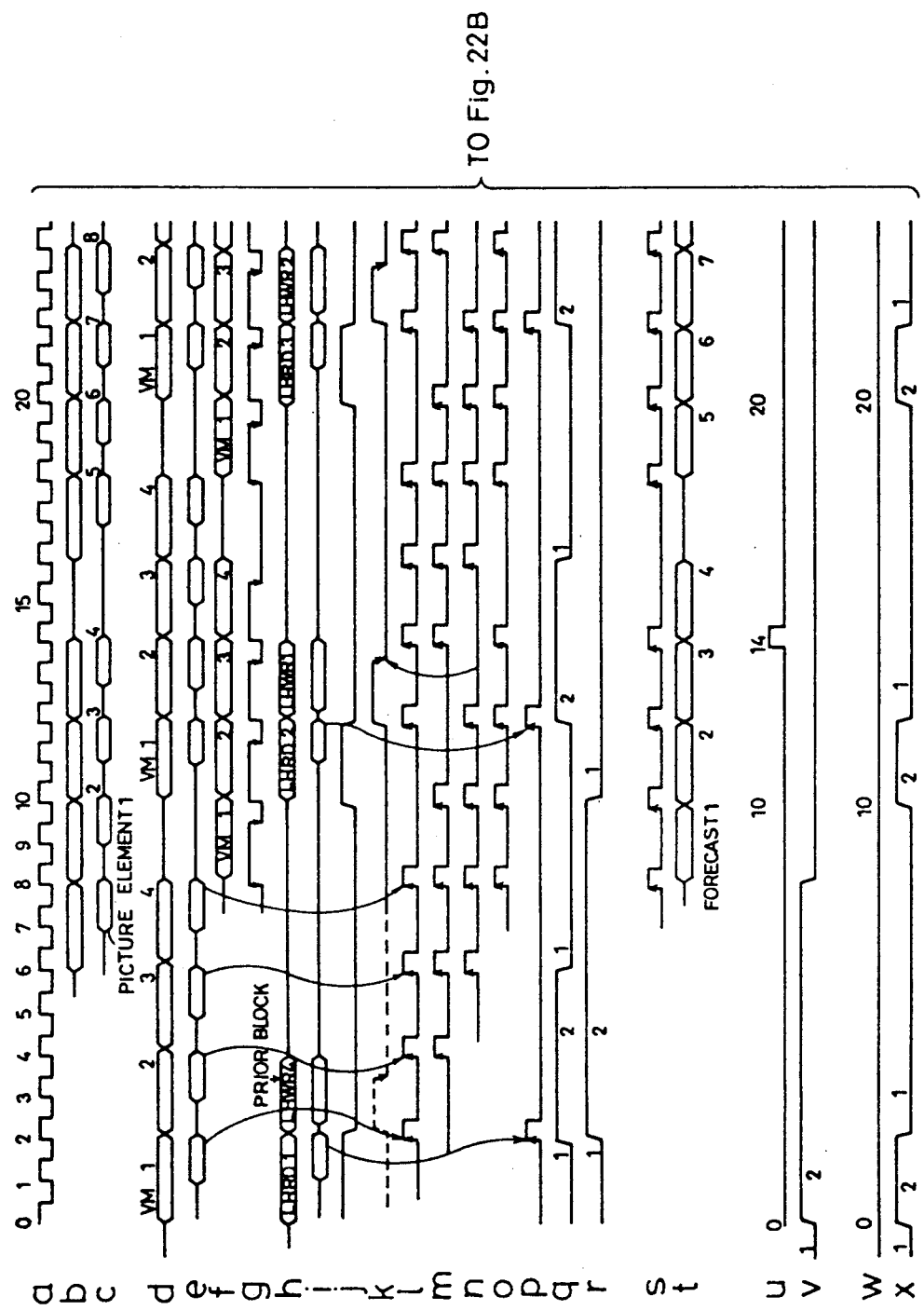

Fig. 30
| ARRANGEMENT PATTERN | VARIABLE LENGTH CODE |
|---|---|
| 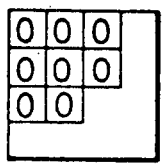 | 0 0 0 |
| 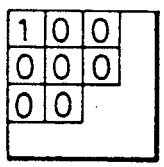 | 1 0 1 |
| 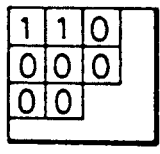 | 0 1 0 0 |
| 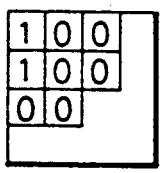 | 0 1 0 1 1 |
Fig. 29
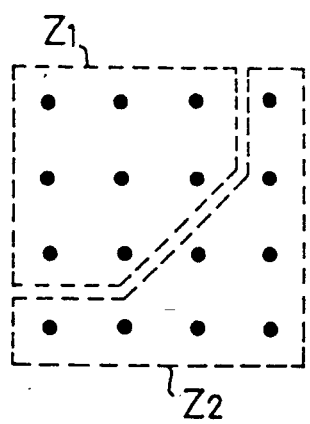
Fig. 32
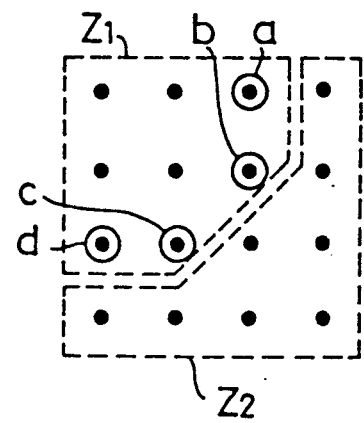

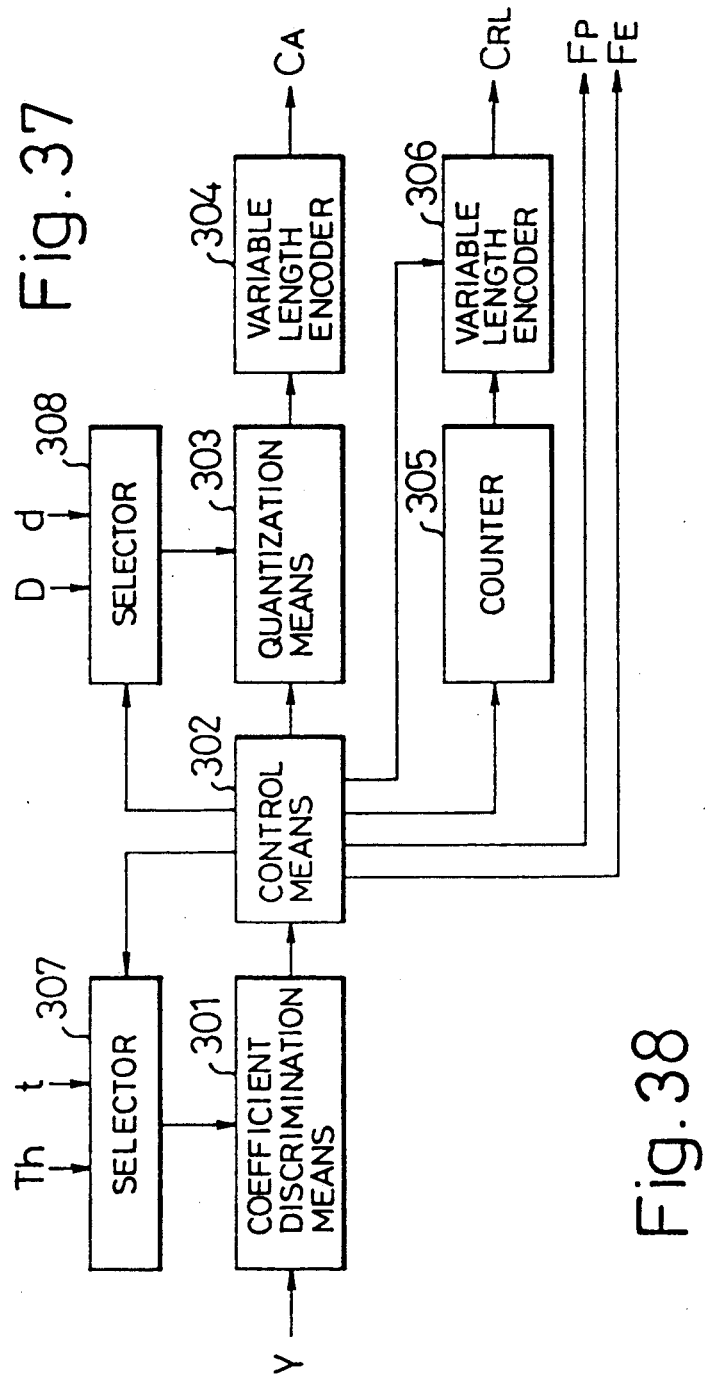

PICTURE ENCODING SYSTEM

TECHNICAL BACKGROUND OF THE INVENTION

This invention relates generally to a picture encoding system and, more particularly, to a system which removes any redundancy in picture data of original picture to compress the data and encodes the same.

DISCLOSURE OF PRIOR ART

Generally, there have been suggested various types of the picture encoding systems in which the picture data redundancy is removed to compress the data and, as a typical one of them, the system of a type called "Discrete Cosine Transform" (which shall be hereinafter referred to simply as "DCT") has been widely utilized.

In the DCT encoding system, each picture is divided into square blocks and the DCT is carried out two dimensionally for every block so as to remove the redundancy within the blocks, whereas the blocks are required to be of a size large enough for rendering any inter-block redundancy remaining after the transform to be negligible. Ordinarily, the block size which can satisfy this condition is considerably so large as to be of an extent of 16×16 picture elements, and there has been a drawback that, even when a measure is taken for carrying out a highly efficient transform operation with a high speed algorithm utilized, it has required a long time for executing this transform operation as well as an enlargement of necessary hardware therefor. In U.S. Pat. No. 4,394,774 to Robert D. Widergren et al, on the other hand, there has been suggested a system in which a shortening of transform operation time is attempted by providing memories for two blocks and called a transport memory between matrix transformers which carrying out the two dimensional DCT, so that data for one block after the column transform, for example, will be stored always in the transport memory while data are always collected on the side of the row transform, so as to allow no delay remained. While, according to this known system, the transform operation speed can be elevated to eventually improve the encoding speed, there still has been involved a problem that the memory amount made double still has kept the hardware to be large so as not to allow the system size to be minimized.

SUMMARY OF THE INVENTION

Accordingly, a primary object of the present invention is to provide a picture encoding system which can allow the picture block size to be smaller, the transform operation to be simpler and eventually the hardware to be simplified, for rendering the entire system to be minimized in size.

According to the present invention, this object can be attained by means of a picture encoding system for subjecting an original picture to an orthogonal transform to remove any redundancy of the original picture and encoding thus obtained orthogonal transform coefficient, which comprises: a prediction means for predicting picture element values within each of the blocks each block having a plurality of picture elements, and into which blocks the original picture is divided, obtaining prediction values, and thereafter obtaining prediction error signals in respect of any difference between the predicted values and true values: a discrete sine transform means for carrying out a discrete sine transform with respect to the obtained prediction error signals to obtain transform coefficients; a quantization means for quantizing the obtained transform coefficients to obtain quantized indexes; an encoding means for encoding the obtained quantized indexes; an inverse quantization means for inversely quantizing the quantized indexes to reproduce the transform coefficients; an inverse discrete sine transform means for carrying out an inverse discrete sine transform with respect to the reproduced transform coefficients to reproduce the transform coefficients; and a reproduction means for reproducing the picture element values within the block adding the reproduced prediction error signals to the predicted values.

Other objects and advantages of the present invention shall be made clear in following description of the invention detailed with reference to preferred embodiments shown in accompanying drawings.

BRIEF EXPLANATION OF DRAWINGS

FIG. 4 is a diagram for explaining predicting operation in the blocks of the system of FIG. 1;

FIG. 5 is an explanatory view for block analysis and boundary value in the system of FIG. 1;

FIGS. 6a to 6c are explanatory views for the predicting operation in another aspect of the present invention and carried out in the blocks of the system of FIG. 1;

FIG. 7 is a block circuit diagram of the prediction means in the system of FIG. 1;

FIG. 14 is a schematic circuit diagram of a column transformer in the system of FIG. 1;

FIG. 15 is an explanatory view for an accumulative addition carried out in the system of FIG. 1;

FIG. 22 is a time chart for the system of FIG. 21;

FIGS. 29 and 30 are respectively an explanatory view for the theory of the system of FIG. 28;

FIG. 32 is an explanatory view for the theory of the system of FIG. 31;

FIG. 37 is a block diagram showing yet another embodiment of the system according to the present invention;

FIG. 38 is an explanatory view for the theory of the system shown in FIG. 37;

Figure 1:
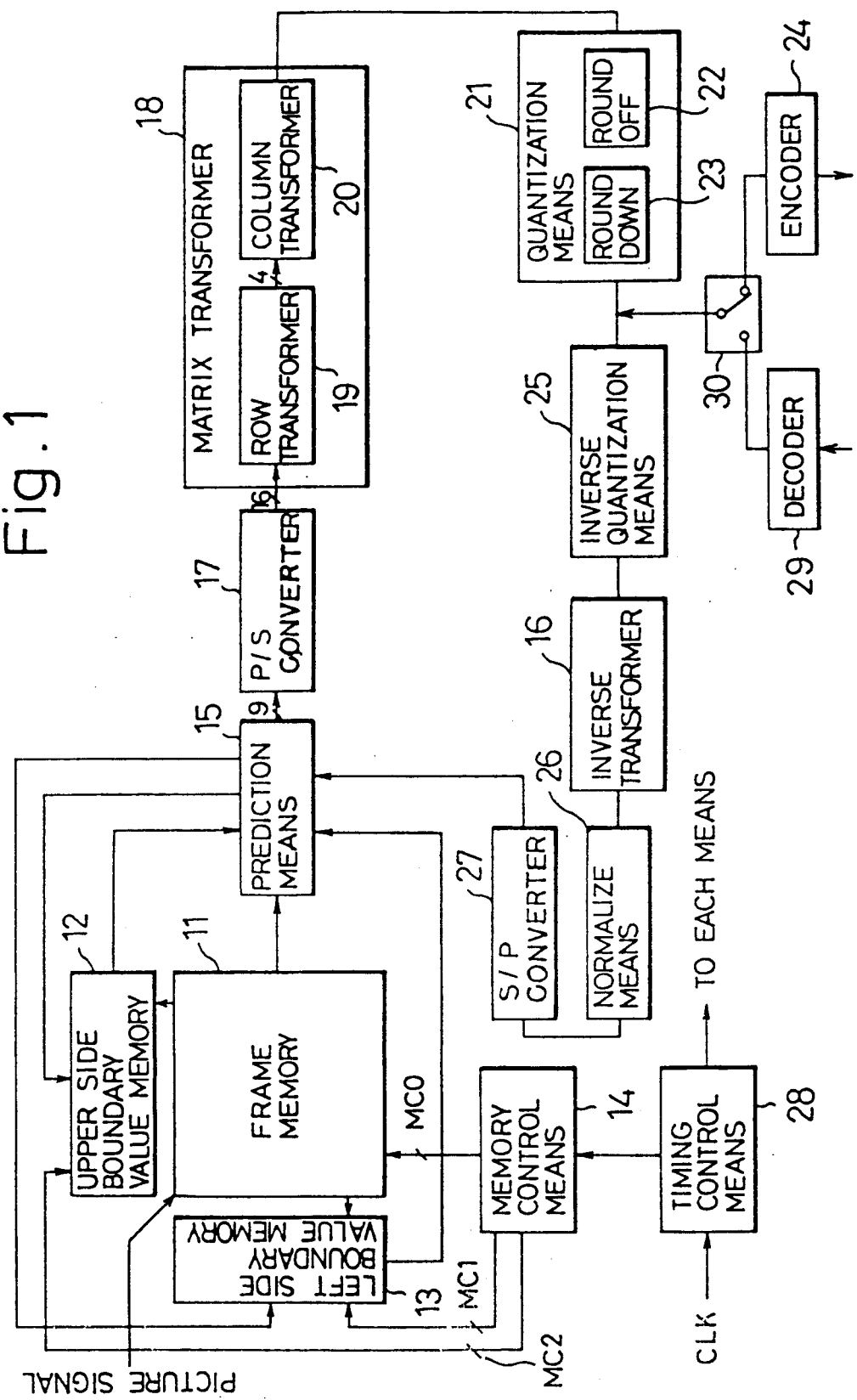
FIG. 1 is an entire block diagram of a picture encoding system according to the present invention.

While the present invention shall now be explained with reference to the respective embodiments shown in the drawings, it should be appreciated that the intention is not to limit the invention only to these embodiments shown but to rather include all modifications, alterations and equivalent arrangements possible within the scope of appended claims.

DISCLOSURE OF PREFERRED EMBODIMENTS

Referring to FIG. 1, the picture encoding system according to the present invention includes a frame memory 11 into which a digitalized picture signal is provided from the exterior, while an upper side boundary value memory 12 and a left side boundary value memory 13 are arranged with respect to this frame memory 11, and these memories 12 and 13 respectively hold a memory capacity for one lateral row and one vertical column of the frame memory 11. These memories 11 to 13 are controlled by a memory control means 14 in respect of address read and write timings. Further, the memory control means 14 receives from a timing control means 28 an output acting to take the entire circuit operation with a clock signal CLK made as a reference, which output being provided to all of the respective means. A prediction means 15 is connected to the respective memories 11 to 13 to carry out an extrapolation prediction on the basis of the respective memory levels so as to provide, as an output, an extrapolation prediction error signal denoting a difference between a predicted value and true value of the picture element, whereby a two dimensional extrapolation prediction means is formed, while this prediction means 15 also functions to reproduce the boundary values by adding to the predicted value a signal received from a later detailed inverse transformer 16, the signal being for reproducing the prediction error. In the reproduced boundary values, the ones for boundary portions with respect to an adjacent block are stored in the boundary value memories 12 and 13 to be used for following prediction.

The prediction error signals of the prediction means 15 are provided in parallel for every picture element and transformed to be serial by a parallel/serial converter 17 which is formed by sixteen shift registers provided preferably for parallel input and output provision and for being changed over by two sets of multiplexers, so as to provide to a next stage matrix transformer 18 data for sixteen picture elements in each block of $4 \times 4$ picture elements sequentially in serial respectively from the least significant bit. This matrix transformer 18 is arranged as a transformer for carrying out the discrete sine transform, and includes a row transformer 19 and a column transformer 20. The operation in this matrix transformer 18 can be executed at a high speed in a bit-slice method. In the present instance, the matrix is different from that of the known $4 \times 4$ discrete sine transform but is of an orthogonal property to be closely similar to known discrete sine transform so that the operation can be simplified in a sense by an integer orthogonal transform.

An output of the matrix transformer 18 is provided to a quantization means 21 which comprises means 22 for rounding off any discrete sine transform coefficient which is below a predetermined threshold level to regard it zero and means 23 for rounding down the dynamic range of the data, and this quantization means 21 provides compressed picture data, which data are subjected, at an encoder 24, to a variable length coding by means of Huffman's code or the like and are provided out of the encoder 24 to a communication path or memory. In this coding, any other method than the Huffman's code may be employed.

The output data of the quantization means 21 are also provided to an inverse quantization means 25 where an operation inverse to that in the quantization means 21 is carried out so as to multiply the compressed picture data signal by a quantizing step width and add thereto a threshold level to restore the state prior to the quantization. Such an output from the inverse quantization means 25 is provided to the foregoing inverse transformer 16, where the output is inverse-transformed with the same arrangement as the matrix transformer 18 since the inverse matrix of that of the foregoing discrete sine transform and integer orthogonal transform are a transposed matrix of the original transformed matrix. The thus inverse-transformed output is subjected at a normalize means 26 to a correction by means of a normalizing factor $1/\sqrt{147}$ for the integer orthogonal transform. At this normalize means 26, the level is made $\sqrt{147}$ times as large as the original upon each time of one integer orthogonal transform, the operation is executed two times for matrix transforms at the matrix transformer 18 and two times as the transforms at the inverse transformer 16, and, so long as the operation precision is sufficiently high, it is expected that the output of the inverse transformer 16 is made $(\sqrt{147})^4 = 147^2$ times as large as the extrapolation prediction error signal which has been provided into the matrix transformer 18. In practice, however, a rounding operation is carried out in the matrix transformer 18 and inverse transformer 16, the output is not made so large as to be $147^2$, and it is possible to render the output to be the same magnitude as that achieved when the primary discrete sine transform of (3-7) formula is executed. For the normalize means 26, therefore, any of general use serial multipliers may be employed.

An output of the normalize means 26 is converted at a serial/parallel converter 27 into parallel data which are to be provided to the foregoing prediction means 15 as the signal for reproducing the prediction error from the boundary values with respect to the next block. In the embodiment shown in FIG. 1, the arrangement is so made that a change over between an operation as the encoding system for obtaining such variable length code as the Huffman's code or the like by encoding the original picture and an operation as the decoding system for obtaining a reproduced picture by decoding the obtained variable length code can be attained by means of a switch 30. For the encoding system operation, the switch 30 is connected to the side of the encoder 24 so that quantized index provided out of the quantization means 21 will be encoded at the encoder 24 and the thus obtained variable length code will be provided to the communication path or the memory. For the decoding system operation, on the other hand, the switch 30 is connected to the side of a decoder 29 so that the variable length code from the communication path or the memory will be decoded at the decoder 29 to have the quantized index reproduced, the thus reproduced quantized index will be inversely transformed at the inverse transformer 16 to have the predicted error reproduced, and the thus reproduced predicted error will be processed through the normalize means 26 and serial/parallel converter 27 and added to the predicted value at the prediction means 15 to obtain the reproduced picture signal.

The operation of the present invention shall be explained next. For the extrapolation prediction, first, in the instant embodiment of the present invention, a simple mean value of upper side and left side picture element values is taken for the picture elements to be predicted, as shown in FIG. 4, this simple mean value is expanded to the whole of the 4×4 block, and prediction values are sequentially obtained from X1,1 employing four upper side boundary values and four left side boundary values. According to this, the prediction means can be made to operate so long as the coding has been completed for the upper and left sides of the block and the boundary values have been obtained. In this case, therefore, it can be realized to render the entire system made into a pipe-line by carrying out the four processings of the two dimensional extrapolation prediction, transform, quantization and inverse transform for every block, specifically in a manner of diagonal scanning.

Figure 2:
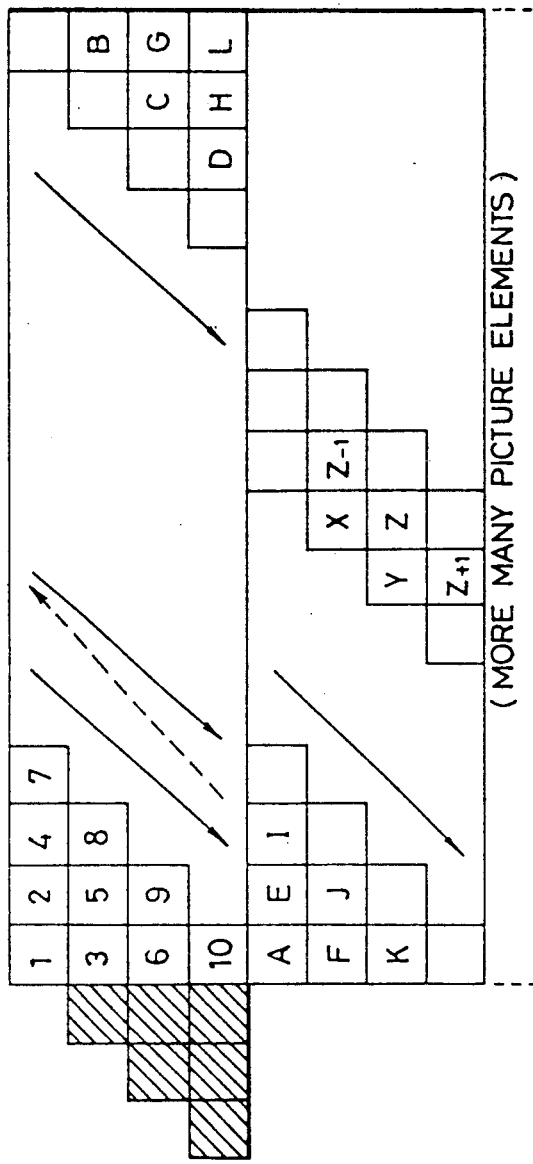
FIG. 2 is an explanatory view for scanning of blocks carried out in the system of FIG. 1.

The block scanning and pipe-line processing arrangement shall be explained next. Referring to FIG. 2, the processings are to be carried out with respect to a block "1" in the order of the extrapolation prediction P, transform $\psi$, quantization Q and inverse-transform $\psi^{-1}$. No processing can be made for a next block "2" unless the inverse-transform $\psi^{-1}$ of the block 1 is completed (in FIG. 3, loss time Loss 1, 3 cycles). Thereafter, the block 2 is processed, and then the block 3 is processed, upon which, as the upper boundary value has already been obtained upon the processing of the block 1, the prediction can be initiated at a time 5T in FIG. 3 at which the prediction process for the block 2 has been completed. For the block "4", the prediction cannot be initiated before completion of the inverse transform of the block 2 (in FIG. 3, loss time Loss 2, 2 cycles). For further following blocks "5" and "6", they can be continuously processed. For the block "7", its prediction cannot be made until completion of the inverse transform of the block 4 (loss time Loss 3, 1 cycle). For the block "8" and followings, their processing can be executed without occurrence of any loss time but with the hardware fully effectively utilized. In FIG. 2, hatched blocks are imaginary ones representing the above loss time.

Figure 3:
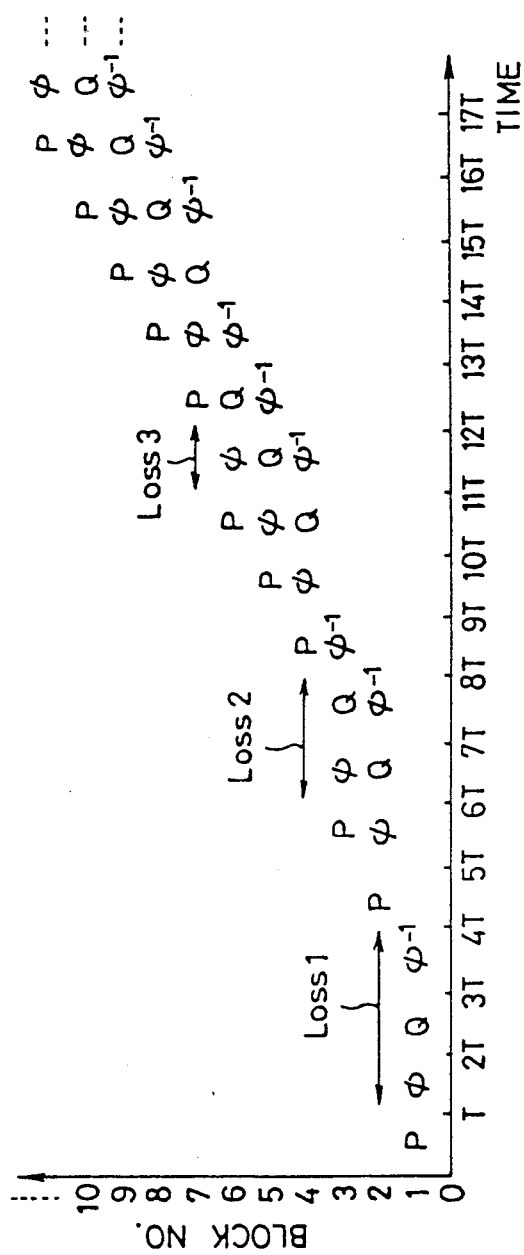
FIG. 3 is a diagram for explaining a pipe line processing in the system of FIG. 1.

In the present embodiment, several stages of the pipe-line are made to be the four stages of the extrapolation P, transform $\psi$, quantization Q and inverse transform $\psi^{-1}$. Therefore, the entire picture as shown in FIG. 2 is processed by scanning the picture blocks along strip-like sections of every four blocks sequentially in longitudinal direction of the picture, and this scanning is continued until the last block at right hand lower corner of the picture is quantized, so as to encode the entire picture. While in this embodiment the number of stages for the pipe-line process has been made four, the stage number may be increased by scanning more finely divided processes, in which event, when the pipe-line process stages are made Np, then the scanning is to be carried out by scanning every strip-like sections of Np blocks sequentially in the longitudinal direction of the picture. FIG. 3, the reference P denotes the two dimensional extrapolation prediction, $\psi$ denotes the transform, Q denotes the quantization and $\psi^{-1}$ denotes the inverse transform, and the block numbers in FIG. 2 are taken on the ordinate.

References shall be made in detail next to the respective processes carried out in each cycle T, including arrangements of means for realizing the processes. Referring now to FIG. 7, the two dimensional extrapolation prediction is executed by the prediction means 15, frame memory 11, upper and left side boundary value memories 12 and 13, memory control means 14 and parallel/serial convert memory 17. Into the upper and left side boundary value memories 12 and 13, the boundary values for prediction of the respective blocks are provided, and the picture data for the top end row as well as the picture data for the left side end column of the picture are received as inputs of initial level. Here, multiplexers MUX1 and MUX2 are set to be on their terminal (1) side, and the initial level picture data are received from the frame memory 11 as inputs, as shown in FIG. 5. The memories 12 and 13 are respectively of a memory of a length of one row or column of the entire picture, and the memory part of their lateral or vertical position corresponding to the respective blocks is to be used when predicting the blocks.

It should be assumed here that the central block "Z" in FIG. 2, for example, is predicting, the lowest side prediction level of an adjacent block "X" and the right edge prediction level of another adjacent block "Y" both of which have been already decided through the processing of these blocks and are placed at corresponding positions in the memories 12 and 13 to the block Z. Then, restored signals of the prediction error signals for the lowest side of the block X and the right edge of the block Y can now be provided out of the inverse transformer 16. In practice, the prediction processing is carried out for the picture elements in such sequence as denoted by numerals each given to the respective small circles representing the elements in FIG. 4. In prediction the block Z, therefore, the lowest side prediction level of the block X is read out of the memory 12 and provided into a latch L1 in FIG. 7. A multiplexer MUX4 is switched over to (2) position to add the prediction error from the inverse transformer 16 to the prediction level in the latch L1, the sum of which provided into a latch L2. The thus achieved level in the latch L2 is a restored level, the sum of the prediction level and its error, which is the upper boundary value X0,1 in FIG. 4. In respect of the left side boundary value X1,0, too, this level is read out of the memory 13 at a next step of the memory 12, a multiplexer MUX5 is switched over to (2) position, the prediction level is added from the inverse transformer 16, and X1,0 is obtained. At this time, the multiplexer MUX3 should have been switched over to (2) position. At a next step, X0,1 and X1,0 are added by an adder ADD3, and the sum is made ½ by rounding off the lower order bit and provided thereout to a latch L3. At a next step, an output of the latch L3 is subtracted at an adder ADD4 from the original picture of the block Z, and the balance is provided thereout as a prediction error signal to parallel/serial convert memories 17A and 17B. The prediction level as an output of the latch L3 is written in the left side boundary value memory 13 and is also provided into a latch L4. This level in the latch L4 is written in the upper side boundary value memory 12 at a next step to be employed for the prediction of another picture element 2. For the picture elements (2), (3) and (4), their prediction can be made possible by returning the multiplexer MUX3 to its (1) side, adding the levels in the memory 12 to those from the inverse transformer 16 to reproduce X0,2 X0,3 and X0,4, respectively, and sequentially adding them to the levels in the latch L3, i.e., the prediction levels of the previous picture element. In prediction a further picture element (5), the prediction level $\hat{X}1,1$ is to be employed as it is, so that the multiplexer MUX4 will be switched over to the (1) side, "0" will be provided into the adder ADD1 and $\hat{X}1,1$ will be provided as it is into the latch L2. Since the picture element (5) is positioned at the left side edge, the left side boundary value memory 13 has received the right edge prediction level of the block Y and, in the present instance, too, the restored level of the prediction error from the inverse transformer 16 is added thereto with the multiplexer MUX5 turned to the (2) side to reproduce X2,0. Here, the multiplexer MUX5 is made to be on the (1) side only when the block Z is in the processing of a block at the left edge of the picture, and "0" at this time is provided into the adder ADD2. This is because, when the block is at the left edge, the level in the left side boundary value memory 13 is the true boundary value. Next, the multiplexer MUX3 is turned to the (2) side to add to "0" the level $\hat{X}1,1$ in the latch L2 to obtain X2,1, which is provided into the latch L3. The prediction of further picture elements (6) to (8) is carried out in the same manner as that for the elements (2) to (4) but, since no prediction error is present to be added from the inverse transformer 16, the multiplexer MUX4 is turned to (1) side to receive an input "0". The multiplexer MUX4 is also made to be on (1) side upon predicting the top edge element of the picture since the level from the upper side boundary value memory 12 is the true boundary value. When the foregoing operation is repeated up to the last picture element (16), the memory 12 has received the inputs X4,1, X4,2, X4,3 and X4,4 while the memory 13 has received X1,4 X2,4, X3,4 and X4,4, and the parallel/serial convert memory 17A has been in receipt of the prediction error of the block Z, {Ym,n} (m,n = 1, 2, 3, 4). While the block Z is being predicted, the parallel/serial convert memory 17B has provided thereout to the matrix transformer 18 a prediction error for a block Z−1 which has been processed earlier by a time T. As the prediction of the block Z terminates, the multiplexer MUX6 is turned to (2) side after a next time T, contents in the parallel/serial convert memory 17A, here the prediction error for the block Z are provided to the matrix transformer 18 and at the same time prediction errors of an adjacent block Z+1 are provided to the parallel/serial convert memory 17B. In this manner, the respective prediction errors for the respective blocks are sequentially provided into the matrix transformer 18. For the parallel/serial convert memories 17A and 17B, the memory of the same arrangement may be employed.

Figure 8:
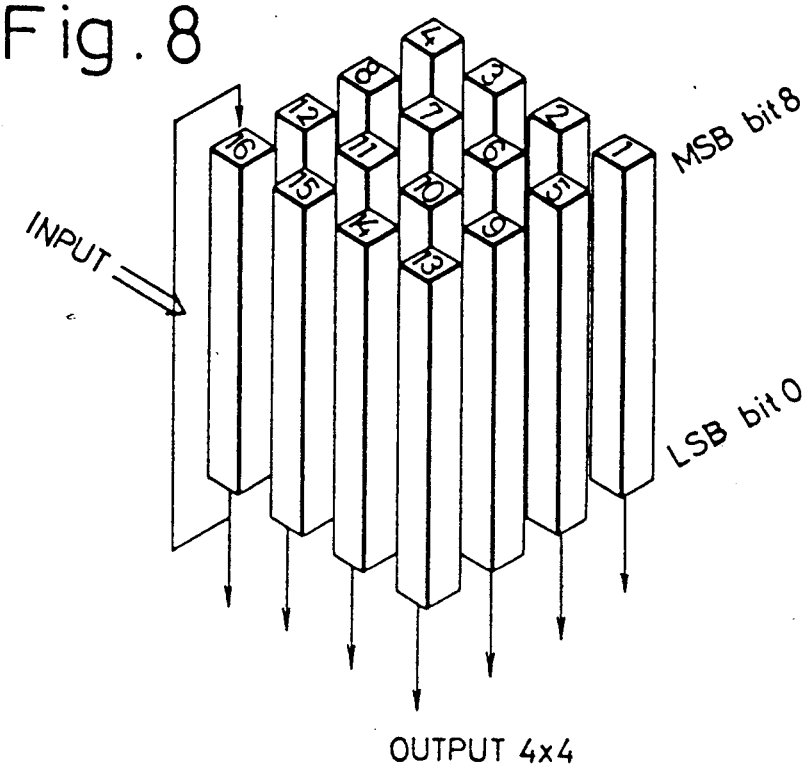
FIG. 8 is an explanatory view for a transforming memory arrangement in the system of FIG. 1.
Figure 9:
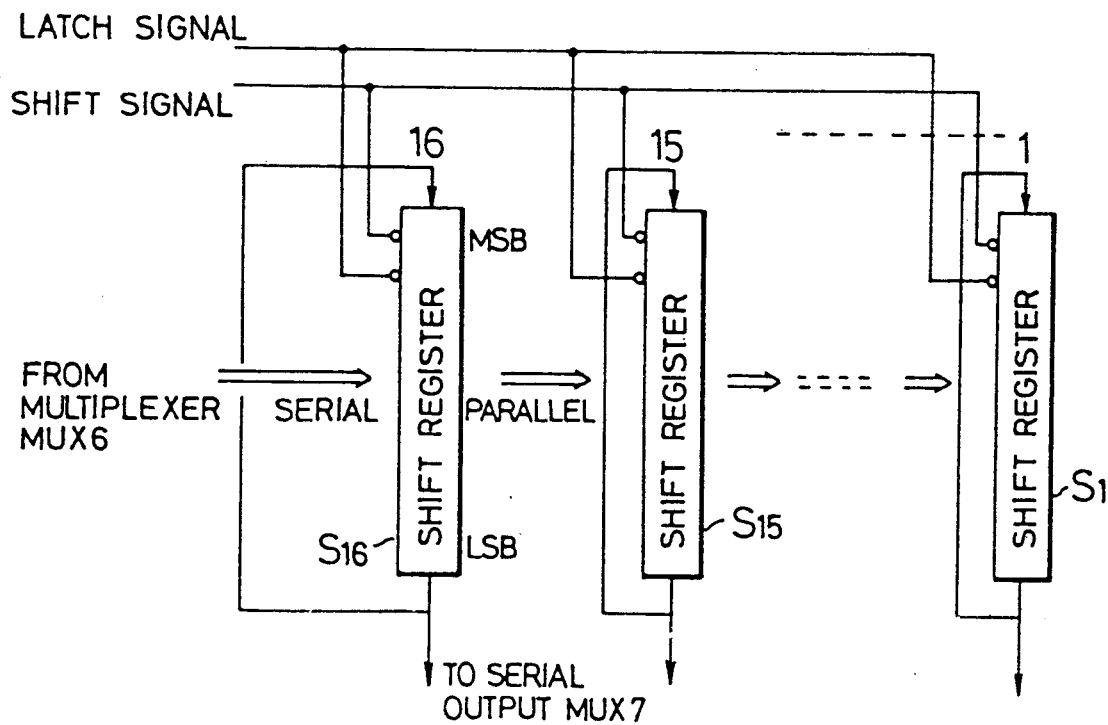
FIG. 9 is a schematic circuit diagram of the transform memory in the system of FIG. 1.
Figure 10:
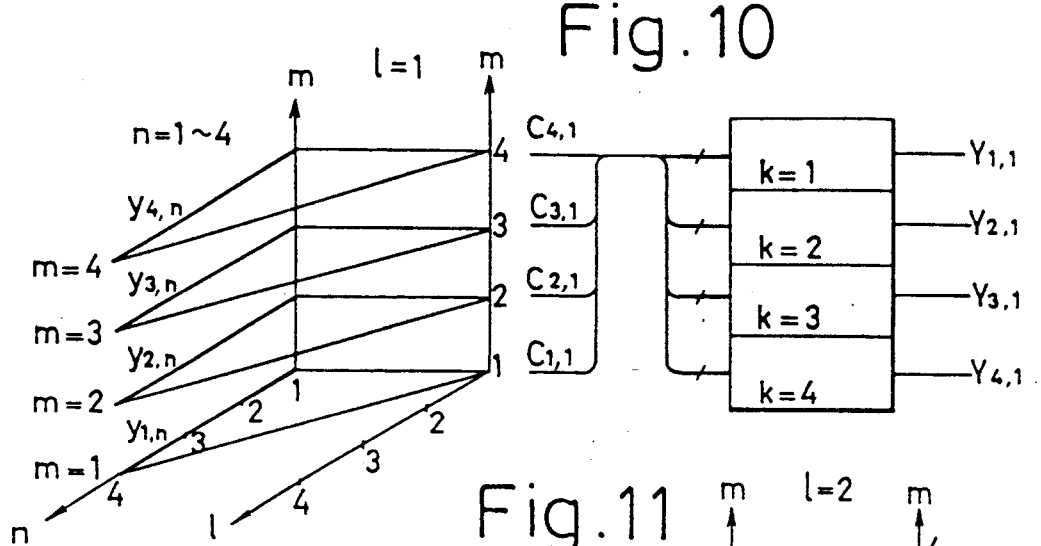
FIGS. 10 to 13 are explanatory views for matrix transforms carried out in the system of FIG. 1.
Figure 11:
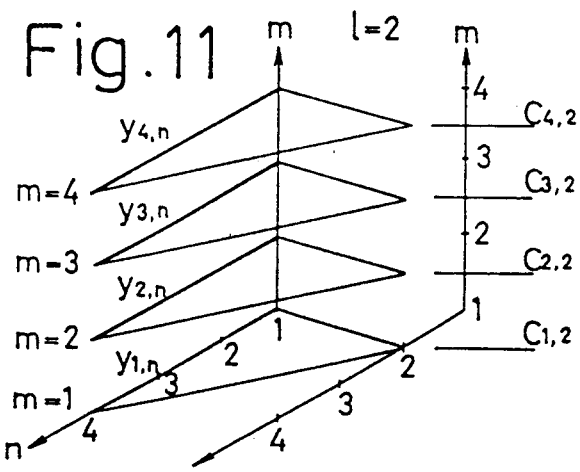
Figure 12:
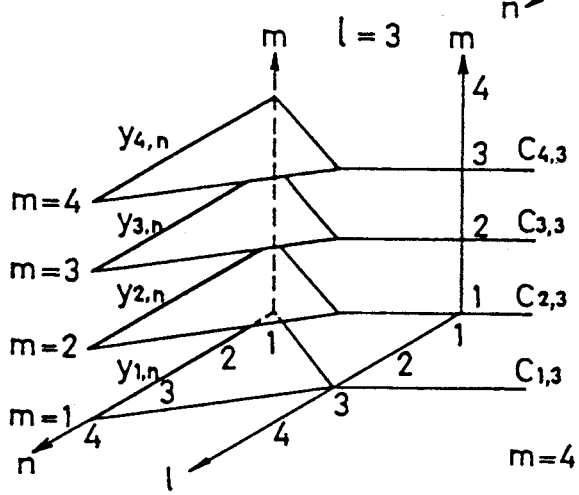
Figure 13:
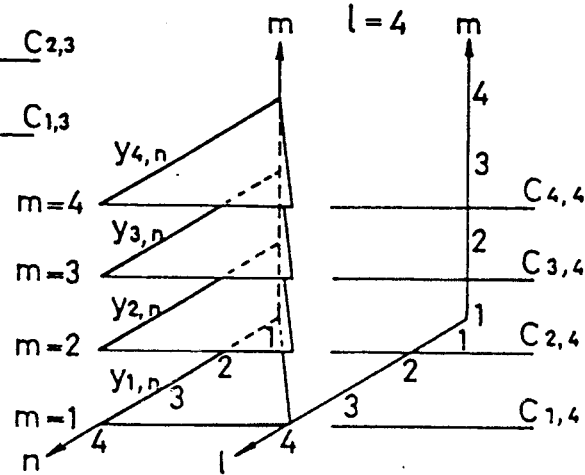

Here, it is preferable that the parallel/serial convert memory is of such an arrangement as shown in FIGS. 8 and 9, in which FIG. 8 shows a preferred arrangement of bit array. In the parallel/serial convert memories 17A and 17B, shift registers S1, ... S16 are provided for parallel input and output provisions, so that they may be parallelly latched respectively by a latch signal and shifted downward by 1 bit respectively by a shift signal. Serial outputs LSB of the shift registers are again provided into the shift registers as rotate inputs MSB. Accordingly, the parallel/serial convert memories 17A and 17B connected through the multiplexer MUX6 to the prediction means 15 are to fill their contents with the prediction errors by receiving the same number of the latch signals as the picture elements in the block, here 4×4=16, they are connected through a multiplexer MUX7 to the matrix transformer 18 during a next time T so that, when the block is of 4×4 elements, the serial data will be provided thereto by an amount for 16 bits. Thus, the memories can provide outputs repeatedly with the repeated reception of the shift signals and, with these outputs, a bit slice process is made possible at the next stage matrix transformer 18.

While in the above the extrapolation prediction has been referred to as being executed in the manner shown in FIG. 4, such three level predicting as shown in FIGS. 6a to 6c may also be adopted. In that case, a next block can be predicted by means of upper, right, rightward upper and leftward upper side blocks as shown in the drawings, so that a block scanning in diagonal direction in particular can be realized and the processing can be made in the pipe-line, and the prediction process may not be limited only to that of FIG. 4.

In the matrix transformer 18, the integer orthogonal transformation is employed so that the orthogonality can be retained only by operating smaller integers and high transformation coding characteristics can be realized. Here, the operation is highly efficiently executed by means of a multiplier circuit with reference to the bit slice method and ROM table. More specifically, the two dimensional discrete sine transform is, as has been known, a continued coupling of twice operated one dimensional transforms (matrix transforms) and may similarly be executed by means of an array orthogonal transformation. In the present invention, the row transform and column transform are defined as follows:

$$\text{Row transform} - Y_{m,n} \xrightarrow{\psi ROW} C_{m,l};$$

and $$\text{Column transform} - C_{m,l} \xrightarrow{\psi COL} Y_{k,l}$$

wherein k and l are wave numbers in the discrete sine transform and are to be sequentially numbered with a basic wave of a basic sine function made "1". Their transformed values are represented by a linear coupling of these basic waves. Now, the row transform is carried out at the row transformer 19 in respect of the respective rows m=1, 2, 3, 4. That is, it will be the one dimensional transform for every row of {Ym,n}. The transformed values {Cm,1} will be represented by a following formula:

$$Cm,l = \sum_{n=1}^{4} \psi l,n Ym,n$$

For the processing of {Cm,1} here, it may be carried out concurrently for m=1, 2, 3, 4 but sequentially for the wave number 1=1, 2, 3, 4. In the next stage column transformer 20, therefore, the column transform is executed by a formula:

$$Yk,l = \sum_{m=1}^{4} \psi k,n Cm,l$$

With the use of the column transformer 20 which transforms the wave numbers k=1, 2, 3, 4 concurrently, {Yk,1} may be made provided sequentially for 1=1, 2, 3, 4, so that, when Cn,1' of 1=1' among Cm,1 (1=1, 2, 3, 4) are obtained, the column transform for obtaining Yk,1' can be immediately carried out. This aspect of the column transform is as shown in FIGS. 10 to 13, in respective which the prediction error data before being transformed are shown on m-n plane, with the prediction errors for every one horizontal row in the respective blocks shown by thick lines, and the identical data are employed at respective stages of FIGS. 10 to 13. In these drawings, further, the data at the time when the row transform has been completed are represented by m−1. More concretely, four row transforms of m=1, 2, 3, 4 for 1=1 among Cm,1 are concurrently carried out. Required operation here will be for the respective rows of the prediction error signals and those of the wave number 1 of the discrete sine transform. As in the present embodiment the integer orthogonal transform is employed, the transforms $$Cm,l = \psi 1 \begin{bmatrix} Ym,1 \\ Ym,2 \\ Ym,3 \\ Ym,4 \end{bmatrix} = (3\ 5\ 7\ 8) \begin{bmatrix} Ym,1 \\ Ym,2 \\ Ym,3 \\ Ym,4 \end{bmatrix}$$

are carried out concurrently at respective positions of m=1, 2, 3, 4. Rewriting this more generally, $$Cm,l = \psi l \begin{bmatrix} Ym,1 \\ Ym,2 \\ Ym,3 \\ Ym,4 \end{bmatrix} \quad (1)$$

Here, $\psi 1=(3578)$, $\psi 2=(770-7)$, $\psi 3=(8-3-75)$ and $\psi 4=(5-87-3)$.

Upon completion of the row transform, the outputs Cm,1 (1=1, 2, 3, 4) are provided into the column transformer 20. As shown in upper parts of FIGS. 10 to 13, the column transformer 20 executes the column transform by carrying out four transforms concurrently in respect of the wave number k for the respective inputs of Cm,1 (1=1, 2, 3, 4). That is, for 1=1, the transforms $$Yk,l = \psi k \cdot Cm,l$$

will be made in respect of each of k=1, 2, 3, 4. Rewriting this more generally, $$Yk,l = \psi k \cdot Cm,l$$

and the transformed values Yk,1 (k,1=1, 2, 3, 4) will be obtained. By carrying out the transforms in such sequence as in the above, it is made unnecessary to rearrange the respective data of the rows and columns in contrast to the known system in which the row and column operations are repeated twice, and any excessive hardware can be omitted. By the employment of the integer orthogonal transform, further, the respective values of the transform coefficient $\psi 1$ can be represented by four bits or so, so that such operation of real number coefficient will not be required, the operational processing can be remarkably simplified and eventually a hardware simplification can be easily realized.

Referring to the bit slice operation partly referred to in the foregoing, the data in the parallel/serial converters 17A and 17B, that is, the prediction error signals Ym,n, will be as in a following formula, when they are represented as the complement of 2 of B+1 bit:

$$Ym,n = 2^0 Y^0{}_{m,n} + 2^1 Y^1{}_{m,n} + \ldots + 2^{B-1} Y^{B-1}{}_{m,n} + 2^B Y^B{}_{m,n} \quad (2)$$
$$= \sum_{b=1}^{B-1} 2^b Y^b{}_{m,n} - 2^B Y^B{}_{m,n}$$

Here, the bit B (MSB) is a code bit, and Ym,n represent the respective bits. At this time, the outputs of the parallel/serial convert memories 17A and 17B are simultaneously serially provided to the row transformer 19 sequentially from a bit $\psi(b=0)$ for all of the 16 picture elements and, as the identical data are required to be provided four times depending on the value of 1 as shown in FIGS. 10 to 13, serial output provisions for four times are to be made by utilizing the rotate function of the parallel/serial convert memories 17A and 17B. Substituting the formula (2) for the formula (1), therefore, $$C^b{}_{m,l} = \psi l \begin{bmatrix} Y^b{}_{m,1} \\ Y^b{}_{m,2} \\ Y^b{}_{m,3} \\ Y^b{}_{m,4} \end{bmatrix} \text{ (when } b = 0 \text{ to } B - 1\text{)}$$

$$C^B{}_{m,l} = \psi l \begin{bmatrix} Y^B{}_{m,1} \\ Y^B{}_{m,2} \\ Y^B{}_{m,3} \\ Y^B{}_{m,4} \end{bmatrix} \text{ (when } b = B\text{)}$$

Coupling them together, $$\sum_{b=1}^{B-1} C^b{}_{m,l} - C^B{}_{m,l} = \sum_{b=0}^{B-1} \psi l \begin{bmatrix} Y^b{}_{m,1} \\ Y^b{}_{m,2} \\ Y^b{}_{m,3} \\ Y^b{}_{m,4} \end{bmatrix} - \psi \begin{bmatrix} Y^b{}_{m,1} \\ Y^b{}_{m,2} \\ Y^b{}_{m,3} \\ Y^b{}_{m,4} \end{bmatrix}$$

Since in this formula the value of Ym,n (n=1, 2, 3, 4) will be always 1 or 0, the value of $$\psi 1 \begin{bmatrix} Y^b{}_{m,1} \\ Y^b{}_{m,2} \\ Y^b{}_{m,3} \\ Y^b{}_{m,4} \end{bmatrix}$$

is preliminarily calculated and ROM table placed in the contents of the memories is prepared for the respective values of $1=1, 2, 3, 4$, whereby the operation can be carried out by performing accumulative addition for each part of $b=0$ to $B=1$ of the bit slice. In this case, the operation will be the subtraction for the highest order bit B, but a timing clock generated only in respect of the highest order bit is prepared and a ROM table with a complement preliminarily taken is prepared to change over the ROM table. Alternatively, the ROM table is kept as it is while two complement means which actuate only upon MCB are provided, and complements of the output of the ROM table will be taken. The ROM table will be required for each of the values (1, 2, 3, 4) of l one by one, so as to be employed for four rows ($m=1, 2, 3, 4$). Further, among the values $$\psi l \begin{bmatrix} Y^b{}_{m,1} \\ Y^b{}_{m,2} \\ Y^b{}_{m,3} \\ Y^b{}_{m,4} \end{bmatrix}$$

the largest one in the absolute value will be $1=1$ and, when $Y_{m,n}$ will be all 1, it will be $3+5+7+8=23$. Even when code part is taken into account, all of partial products can be represented by complement expression of 2 of 6 bits. Required ROM for the row transformer 19 holds in total 7 bits including input 4 bits as an address, 2 bits for changing over the l value and changing-over 1 bit with respect to complement table for use with MSB, and its output can be obtained from 6 bits. It should be appreciated that any ROM table for use with MSB is made unnecessary by the employment of the two complement means as in the above.

In FIG. 14, a hardware of the row transformer 19 is shown in details, and an arrangement for the first row $m=1$ only is specifically shown to details while arrangements for other rows $m=2$ to 4 will be the same as that for the first row. In this row transformer 19, there are included, in addition to a ROM 19a, a latch D1 for taking the timing, full adder FAa for 7 bit addition, latch D2 for accumulative addition, and shift register SR. With such arrangement, in particular, the output of the latch D2 for the accumulative addition is deviated by 1 bit to a lower order from an output of the latch D1, that is, caused to shift rightward, and is provided to the full adder FAa together with the output of the latch D1. Accordingly, bit-slice partial product sum of matrix product sum operation which being the ROM output is accumulatively added. This operational mode is as shown in FIG. 15, in which input signals provided from the parallel/serial convert memories 17A and 17B sequentially from bit 0 will be sequentially added as being ROM outputs respectively of 6 bits. In the illustration, the outputs later coming are shown to shift progressively upward but, in practice, previously accumulated sum is made to shift rightward and added to a new ROM output. While the lower 3 bits are shown respectively as being added by "1", this is for the rounding-off purpose, and 7 is added for cutting by 4 bits later. This operation is carried out through a control circuit with a use of a U/D signal line connected to a carry input of the full adder FAa. The data practically employed here will be such bits as those shown respectively with a small circle added, which are prepared to be provided as serial outputs at the time when a slice addition of bit 4 is carried out. At the time when MBS is finally added, the shift register SR in FIG. 14 receives parallel inputs of 6 bits which are thereafter provided out sequentially in serial manner. At the shift register SR, on the other hand, the lowest order bit of the latch D2 is provided out since the time of addition of the partial product sum of bit 4, upper order 6 bits in signals of the latch D2 are received in parallel through S/L upon completion of the addition of MSB, and thereafter the received 6 bits are provided out in serial manner. Accordingly, the shift register SR is formed as a unique register which provides as its output the serial data. Here, a $\overline{CLR}$ signal provided into the latch D2 is used when an input of a slice of bit 0 is received with a signal rendering the value of the latch D2 to be 0, in such that a calculation is sequentially carried out with respect to 1 and the particular signal renders the latch D2 to be 0 every time when the l value is changed and the ROM table is exchanged.

Figure 16:
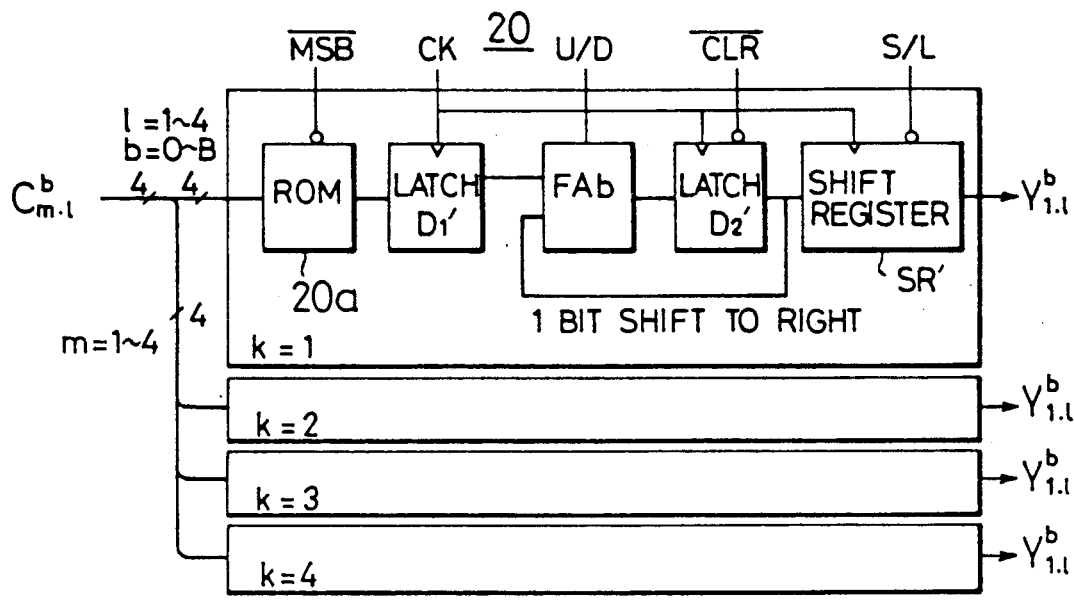
FIG. 16 is a schematic circuit diagram of a column transformer in the system of FIG. 1.

In FIG. 16, details of the column transformer 20 are shown, in which, too, only the arrangement of the first column $k=1$ is shown specifically, while other columns $k=2$ to 4 are of the same arrangement as the first column, so that the Cm,1 signals transformed in horizontal direction will be provided from the row transformer 19 to the column transformer 20 as its inputs, concurrently from 1 to 4 for m and sequentially for 1. In this column transformer 20, contents of ROM will vary depending on the value of wave numbers k simultaneously generated, and the transformer 20 is distinct in this respect from the row transformer 20 is distinct in this respect from the row transformer 19, so that the ROM table of $\psi 1$ will have to be employed for $k=1$ while the ROM table of $\psi k$ be employed for $k=k'$. In the present instance, the ROM 20a may be the one which adds to 4 bit input an $\overline{MBS}$ signal by 1 bit to provide an 5 bit address and 6 bit output. A latch D1', full adder FAb, latch D2' and shift register SR' may respectively be of the same structure as that of corresponding member in the row transformer 19. Now, the outputs respectively of 10 bits are provided concurrently from the row transformer 19 to the respective column transformers, and the wave numbers $k=1$ to 4 will be transformed, upon which the 4 bit round-down operation is also performed at the column transformer 20 in the same manner as in the row transformer 19, and outputs are provided in serial manner in an aspect of $\{Y1,1\}$ $1=1, 2, 3, 4$. Since one lower order bit of MSB is only expanded in the code and has no significance, MSB is rounded off and a transformed output of 10 bits will be taken. More concretely, this operation can be realized by decreasing one shift clock of the last staged shift register SR'.

Figure 17:
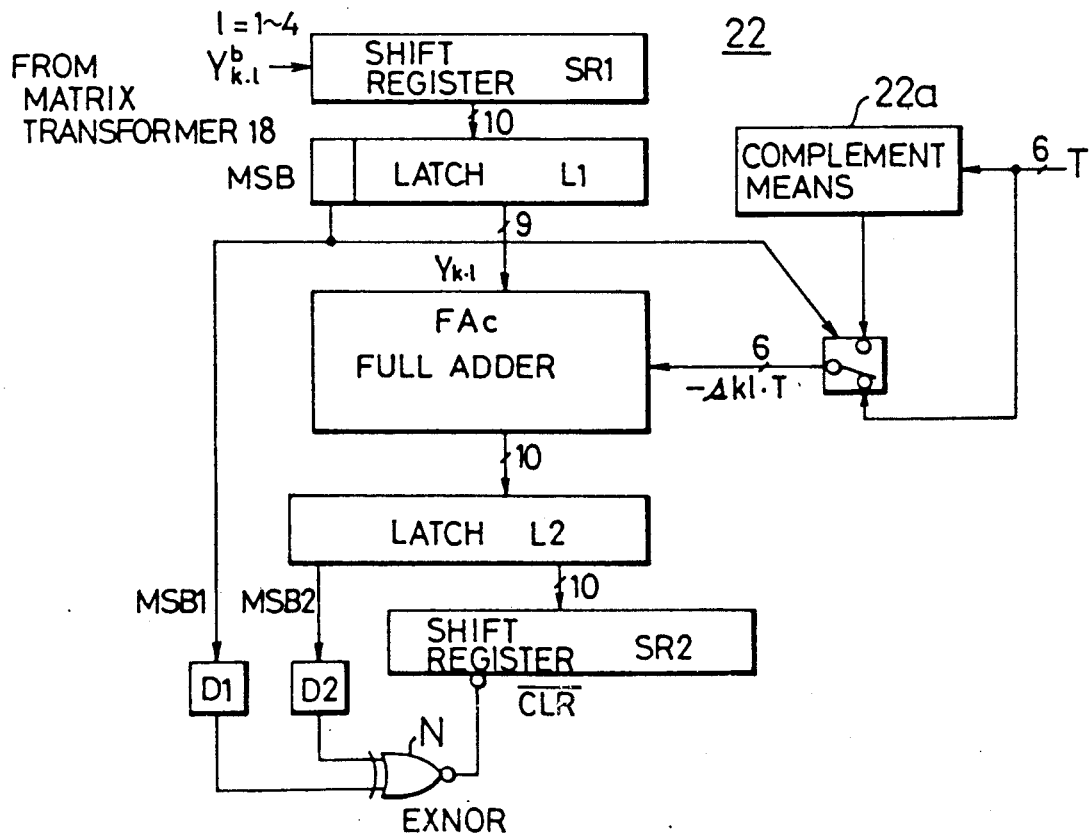
FIG. 17 is a schematic circuit diagram of a round-off means in the system of FIG. 1.
Figure 18:
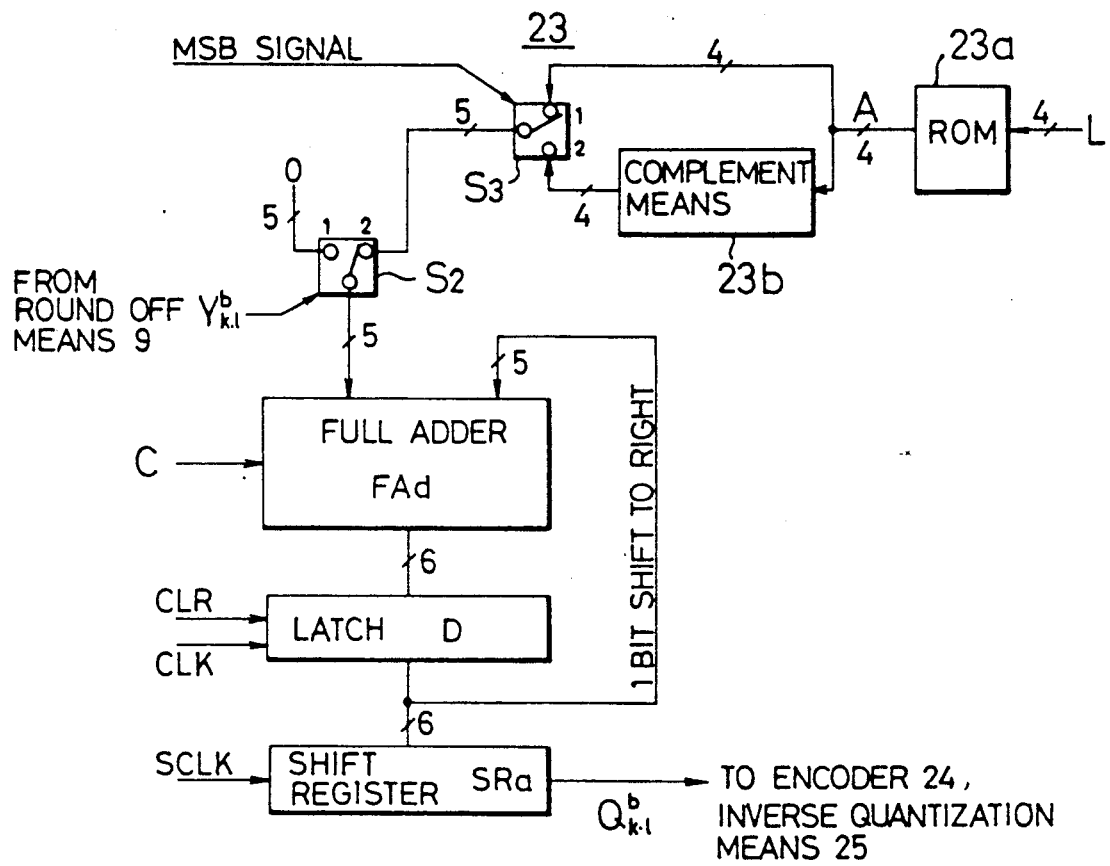
FIG. 18 is a schematic circuit diagram of a quantization means in the system of FIG. 1.

The quantization 21 comprises such round-off means 22 as in FIG. 17 and such round-down means 23 as in FIG. 18, and in practice four sets of these means 22 and 23 are employed. Here, the quantization is a process carried out by means of a following formula when the threshold level is set Th and the step width L:

$$Q_{k,1} = s_{k,1}(|Y_{k,1}| - Th)/L$$

wherein Qk,1 being the transform coefficient of the respective blocks after the quantization, Yk,1 being the transform coefficient of the respective blocks after the transform, and sk,1 being codes of Yk,1 of +1 or −1. Modifying the above formula further:

$$Qk,1 = (Yk,1 - sk,1 Th)/L = (Yk,1 - sk,1 Th) \cdot A/2^P \qquad (3)$$

In the round-off means 22, first, an operation is carried out with respect to Yk,1 in the above formula. The input Yk,1 is the transform coefficient obtainable from the matrix transformer 18, serial data of 10 bits are provided into a shift register SR1 in the round-off means 22 and then into a latch L1 in parallel with one another. The top order bit MSB1 of the latch L1 represents sk,1, and this bit is employed for determining the addition or subtraction of the value Th (a complement of Th is taken at a complement means 22a for 2). When this MSB1 is 1, sk,1 = −1, and 6 bit selector S1 is turned to be on (1) side but, when MSB1 is 0, sk,1 = 1 and the selector S1 is turned to (2) side, so as to take a complement of Th value for the addition. The value of the latch L1 and an output of the selector S1 are added at a full adder FAc, their sum is loaded to a latch L2 and then to a shift register SR2, and serial outputs are provided thereout. When, at this time, the top order bit MSB2 of the latch L2 differs from MSB1, it means that the absolute value of Yk,1 is smaller than Th, this value is, therefore, rounded off and the shift register SR2 is cleared by an output of an exclusive NOR circuit EXNOR N. Flip-flops D1 and D2 are provided for functioning to preserve MSB1 and MSB2, so that their output will be provided into the exclusive NOR circuit EXNOR N.

In the round-down circuit 23 of FIG. 18 which executes latter half of the foregoing formula (3), the step width L is employed in carrying out the quantization, upon which a division operation with the step width L is realized by performing a multiplication by such an integer value A as $A = 2^P/L$ and then a division by $2^P$. Upon the multiplication by A, a method of accumulatively adding A output from a ROM 23a for deriving the A value from the L value (the ROM being ROM table which has preliminarily calculated out the A value with respect to L) and products of respective sliced bits (1 or 0) of Yk,1 is employed. That is, the arrangement is so made that a partial product is prepared by a selector S2 which selects 0 when Yk,1 = 0 but an A value when Yk,1 = 1, the selector S2 is connected to one of input terminals of a full adder FAd, and outputs of the selector S2 are accumulatively added at the full adder FAd and a latch D which receives outputs of the full adder FAd and returns them through 1 bit shift to right to the other input terminal of the full adder FAd. In this case, Yk,1 are of a complement expression of 2 so that, upon receipt of the input MSB, it will be necessary that a selector S3 is turned to the selector S2 side, a complement of 2 of A as a partial product is provided out of a complement means 23b and the product is further divided by 2. Here, P = 7 and Yk,1 are represented respectively in 10 bits, so that the partial products of A by means of the full adder FAd and latch D will be added 10 times. Upon completion of the operation, its upper order bits are provided into a shift register SRa to be provided thereout in serial manner. With this operation carried out, upper order 6 bits of Yk,1 × A are taken up while lower order 7 bits are rounded off. When a carry input to the full adder FAd is made 1 upon the accumulative addition of lower order 6 bits, it is made possible to round off the lower order 7 bits and to round down the quantized data Qk,1.

In the inverse quantization means 25 shown in FIG. 1, on the other hand, an operation inverse to that explained with reference to FIGS. 17 and 18 is to be carried out. For the inverse quantization, first, Qk,1 are multiplied by L, the amount of Th rounded off is added thereto, and the inverse quantizing operation can be executed employing the round-down means 23 of FIG. 18 and the round-off means 22 of FIG. 17 used as the quatization means.

The inverse transformer 16 is of the same arrangement as the row and column transformers 19 and 20 in the matrix transformer 18 and, since the inverse matrix ψ (transposed matrix) of the orthogonal matrix ψ is employed here, the inverse transform can be realized by an operation totally inverse to that of the matrix transformer 18, with the only difference in the data of the ROM table from the matrix transformer 18. The output data are subjected here to the rounding down for 3 bits, an operation for rounding off any unnecessary MSB is executed, and then the data are provided to the normalize means 26.

The normalize means 26 is to correct the normalizing coefficient of $1/\sqrt{147}$ as has been partly referred to and, utilizing the fact that the correcting coefficient for restoring the same level of the signal level as the apredication error signal is $2^{14}/147^{2-1} = \frac{3}{4}$, multiplies all of the inverse transformed outputs by $\frac{3}{4}$. Since in this case the outputs from the inverse transformer 16 are bit-serial and simultaneous for 4 picture elements, the normalization may be realized by such known hardwares as four serial multipliers (tripling operation) and means for rounding off lower order 2 bits (operation for dividing by 4).

Figure 19:
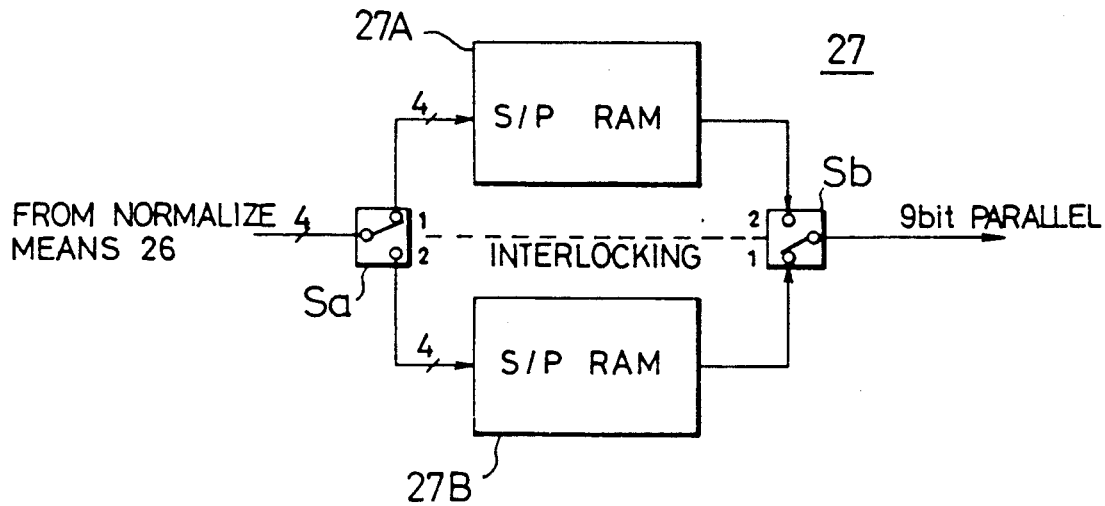
FIG. 19 is a schematic circuit diagram of another transform memory in the system of FIG. 1.
Figure 20:
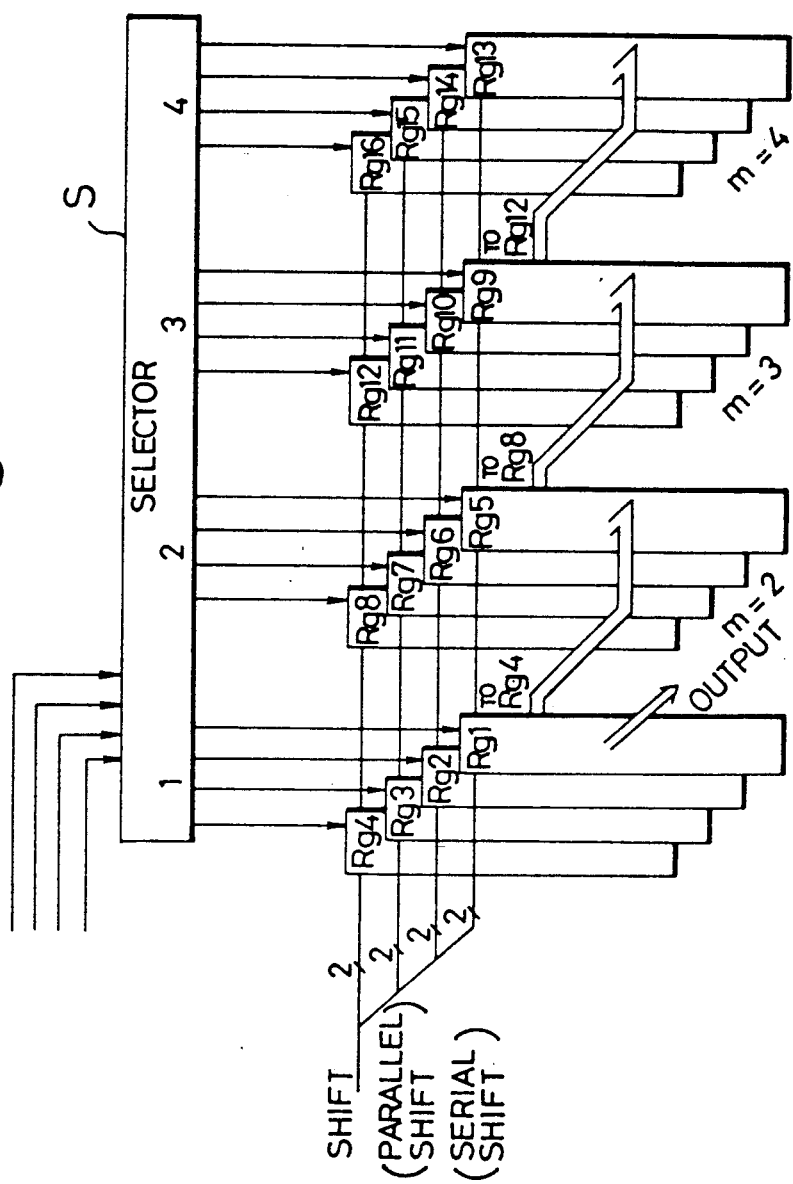
FIG. 20 is a diagram showing slightly in details a RAM employed in another transform memory in the system of FIG. 1.

The serial/parallel converter 27 comprises registers of serial input and parallel output for carrying out an operation inverse to that of the parallel/serial converter 17, which are arranged as shown in FIG. 19. The serial inputs from the normalize means 26 cause a pair of selectors Sa and Sb to be actuated respectively in correspondence to the value of m, so that the serial data will be provided out for every row, as passed through either one of S/P RAM 27A and 27B. Upon termination of the inputs, the selectors Sa and Sb are changed over to be, for example, both on their terminal (2) side so as to provide further inputs to the S/P RAM 27B. Here, the data are provided out of the other S/P RAM 27A while being shifted in parallel, to the prediction means 15 in the order of the picture elements, and only necessary ones are utilized. In practice, the necessary data for the prediction are respective values of 4, 8, 12, 13, 14, 15 and 16 which are to be the boundary with respect to a next block among the 16 elements, and the data of this part only may be accumulated. In FIG. 20, there is shown an arrangement of the S/P RAM's 27A and 27B, which comprises registers Rg1 through Rg16 for the serial input and parallel output, as well as a selector S.

While in the foregoing embodiment the original picture is made 8 bits and proper bit numbers are numerically shown on respective connection lines in FIGS. 1, 7, 10 and 16–19, the bit numbers are to vary depending also on the data compression rate and are not limited to those shown. Further, while the block number has been referred to as being 4 × 4, the encoding of the extrapolation prediction discrete sine transform according to the present invention can be employed with respect to the blocks of various sizes or numbers.

Figure 21:
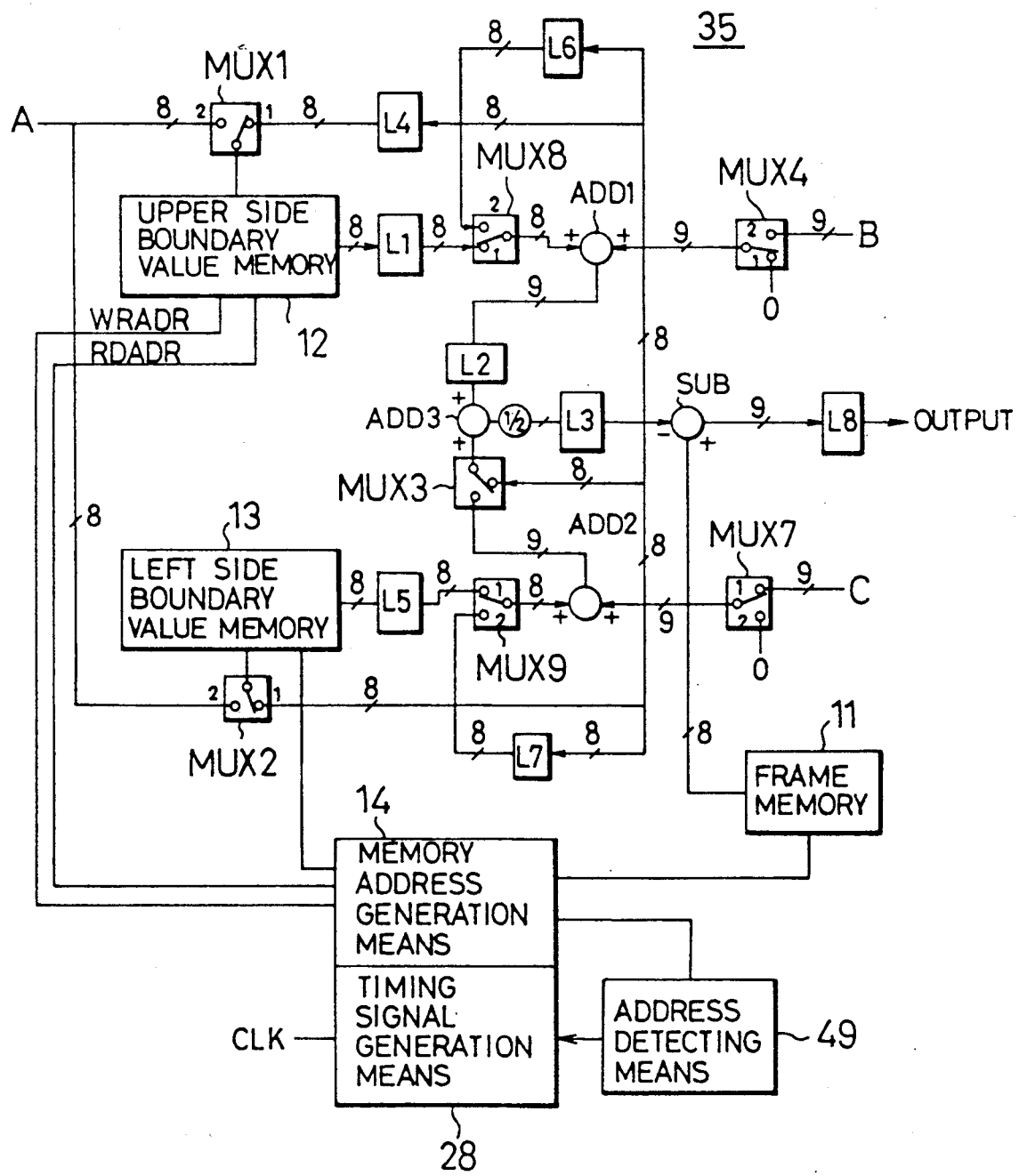
FIG. 21 is a circuit diagram showing the prediction means in another embodiment of the picture encoding system according to the present invention.
Figure 23:
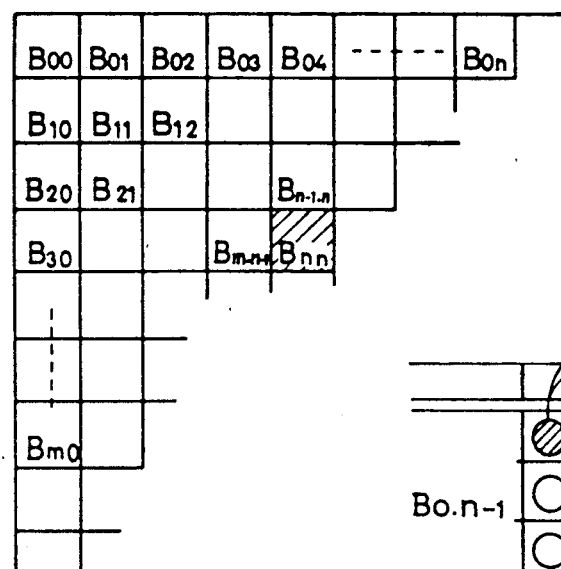
FIG. 23 is an explanatory view for a scanning for the blocks carried out in the system of FIG. 21.
Figure 24:
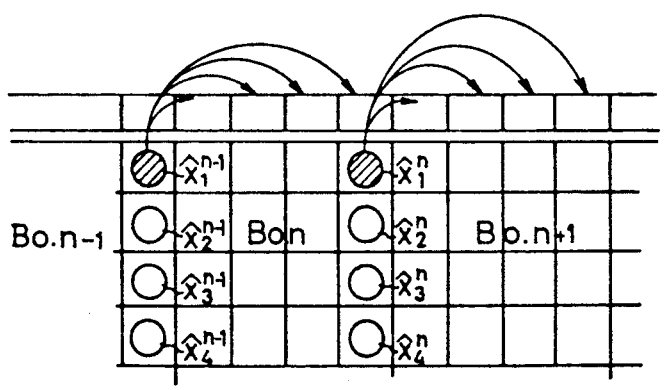
FIGS. 24 to 26 are explanatory views for the predicting operation in the blocks of the system of FIG. 21.
Figure 25:
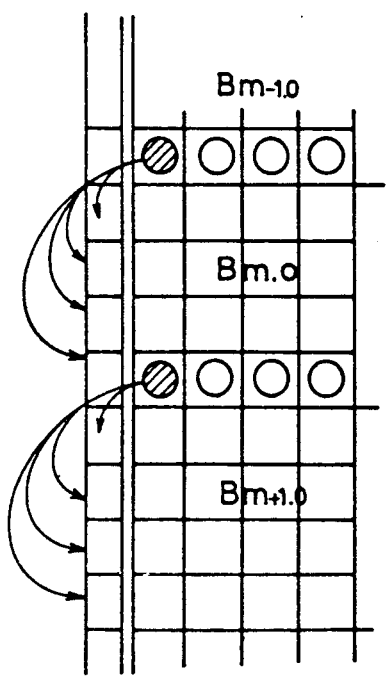
Figure 26:
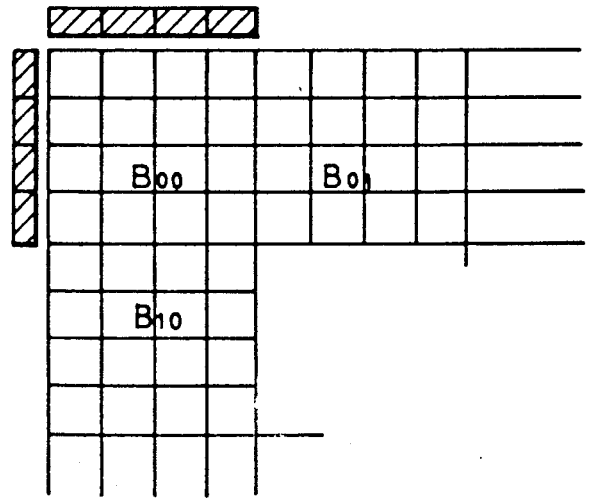

According to another feature of the present invention, the picture encoding system can be more simplified by adequately setting the initial value upon the prediction processing. In FIG. 21, there is shown a prediction means 35 in another aspect but which can take the place of the prediction means 15 in FIG. 7, wherein equivalent elements to those shown in FIGS. 7 or 1 are denoted by the same reference numerals or symbols. FIG. 22 is a time chart of the operation of the respective parts in the prediction means 35 of FIG. 21, in which a waveform a denotes the clock signal CLK from an external clock generator and twice as quick as the basic cycle; b denotes address signal FMADR of the frame memory 11; c denotes data output FMDATA of the frame memory 11; d denotes read-out address level UMRDADR of the upper side boundary value memory 12; e denotes read-out level RMRD of the memory 12; f denotes write address level of the memory 12; g denotes write signal UMWR of the memory 12; h denotes address level LMADR of the left side boundary value memory 13; i denotes data bus value of the left side boundary value memory 13; 1-p, s, u and w denote trigger signals of latches L1–L5, L8, L6, L7; and q, r, v and x denote switch-over timing signals of multiplexers MUX3, MUX4, MUX8 and MUX9.

Referring to the operation of the present invention with reference to FIGS. 23 to 26, a left side top corner block B00 is now to be measured, the operation for which is simplified so long as fixed initial values have been received as initial four input levels of the upper side and left side boundary value memories 12 and 13 corresponding to the block B00, and therefore, the multiplexers MUX1 and MUX2 are turned to be on (2) side to be initialized and are thereafter turned back to (1) side. At this time, the prediction levels of a previous block are read out initially from the upper side boundary value memory 12 to the latch L1 and from the left side boundary value memory 13 to the latch L5, respectively, and then outputs of the latch L1 and multiplexer MUX4 are added together and held by the latch L2. In prediction the picture elements 1 to 4, the levels read out of the upper side boundary value memory 12 are the prediction levels for the lower side of a block Bm-1,n, they are reproduced by means of addition thereto of restored levels of the prediction errors, and the multiplexer MUX4 is turned to (2) side. Except for this occasion, the multiplexer MUX4 is kept on (1) side to have an input 0 provided to one of terminals of an adder ADD1. A multiplexer MUX6 is also normally kept on (1) side. An output of a latch L5 is provided through another multiplexer MUX9 also normally on (1) side to an adder ADD2, and a restored level of the prediction error from a device terminal C is similarly provided to the adder ADD2 to be added to the output.

The data in the left side boundary value memory 13 are read thereout only when picture elements 1, 5, 9 and 13 are predicting. At the time of the prediction of other elements, the multiplexer MUX3 is placed on (1) side and outputs of the adder ADD2 are opened. The prediction levels reproduced with the multiplexer MUX3 made (2) side are subjected to an addition at an adder ADD3 of the output from the latch L2, ½ operation will be carried out by rounding off the lower order bits, and thereafter the result will be held by the latch L3 having the prediction values of $\hat{X}m,n$. Such levels in the latch L3 are to be used again for prediction the picture elements immediately below the elements so far processed, and are written into the upper side boundary value memory 12 for preservation. A latch L4 may be employed for matching the timing, and the level in the latch L3 may be written after being held for 1 cycle, that is, during 2 clocks. When other picture elements 4, 8, 12 and 16 have been prediction, their prediction levels $\hat{X}1,4$, $\hat{X}2,4$, $\hat{X}3,4$ and $\hat{X}4,4$ are necessary for the prediction of a right side adjacent block and are written in the left side boundary value memory 13 to be held herein until when the right side adjacent block is predicting. Contents of the latch L3 are subtracted at a subtractor SUB from contents of the frame memory 11 read out and are held in a latch L8 as the prediction error outputs.

In a state where the picture element 1 has been predicted in the foregoing manner and the prediction levels $\hat{X}1,1$ are held in the latch L3, then the required data for predicting the position of the next picture element will be these prediction levels $\hat{X}1,1$ as well as X02 (reproduced levels of contents of corresponding position in the upper side boundary value memory 12). At this time, the levels are read respectively at every 1 cycle as shown in FIG. 22, f, and the reproduced levels X02 have been, therefore, already held in the latch L2. Accordingly, at the next cycle, the multiplexer MUX3 is turned to (1) side to cause ½ of the sum of the levels of the latches L2 and L3 to be held again in the latch L3, and the prediction levels $\hat{X}1,2$ of the picture element 2 are reproduced. Further prediction levels $\hat{X}1,3$ and $\hat{X}1,4$ are similarly prepared, these prediction levels $\hat{X}1,1$, $\hat{X}1,2$, $\hat{X}1,3$ and $\hat{X}1,4$ are all written through the latch L4 into the upper side boundary value memory 12, while the prediction levels $\hat{X}1,4$ will be also written in the left side boundary value memory 13.

In respect of the prediction of the picture element 5, the prediction levels of right side edge of the block on left side are read out of the left side boundary value memory 13, the restored prediction error level from the device terminal C is added thereto to reproduce X20, and simultaneously the prediction levels $\hat{X}1,1$ previously held in the upper side boundary memory 12 are read thereout to be held in the latch L1. The prediction levels X1,1 are transferred to the latch L2 at a next cycle, upon which the multiplexer MUX4 is placed on (1) side so as to add 0 to the levels $\hat{X}1,1$, which are then held by the latch L3, and the prediction levels $\hat{X}2,1$ are prepared.

In the same manner as in the above, the block prediction is repetitively executed.

In addition, the operation with respect to the first left side upper corner block B00, as well as that for blocks B0n and Bm0 respectively on the upper side and left side of the picture (see FIG. 23) will be partly different from the normal operation. In the present embodiment, therefore, an address detecting means 49 preliminarily detects whether the operation is either that for these three blocks or that for the ordinary blocks, and then the data are provided to a timing signal generation means 28 to cause the timing varied. First, the prediction for the block B00 may be the same as that for the ordinary blocks, and the initial values are provided only to parts in the upper side and left side boundary value memories 12 and 13, the parts corresponding to the block B00. On the other hand, it is required for the block B00 to hold the prediction levels $\hat{X}1,4$ and $\hat{X}4,1$, concurrently, and trigger signals of latches L6 and L7 such as in FIG. 22, u and m, of latches L6 and L7 are provided. Upon the prediction of the block B00, further, the multiplexers MUX4 and MUX7 are always placed respectively on (1) side and (2) side.

For the upper side block B0n, the prediction levels held in the latch L6 among those for the left adjacent block are to be employed as the upper side prediction levels. Therefore, as in FIG. 22, v, the multiplexer MUX8 is turned to (2) side, and a trigger signal is provided for latch L6 to have the prediction levels $\hat{X}1,4$ held therein for the prediction of right adjacent block, upon which the multiplexer MUX4 is not required to reproduce the upper side and is left on the (1) side, while other latches L1-L5 will be in the state of FIG. 21. Further, for the left side block, the levels in the latch L7 are read out as in FIG. 22, w, at a read timing of the left side boundary value memory 13, and the levels in the latch L7 are provided out for holding the prediction levels $\hat{X}4,4$. The multiplexer MUX7 is made on (2) side. This is because the left side boundary values cannot be reproduced, similarly to the block B00.

As will be understood from FIG. 22, the foregoing operation causes the prediction errors for every block to be sequentially provided out to complete the prediction, and other arrangements for the encoding may be those which have been shown in FIG. 1.

Figure 27:
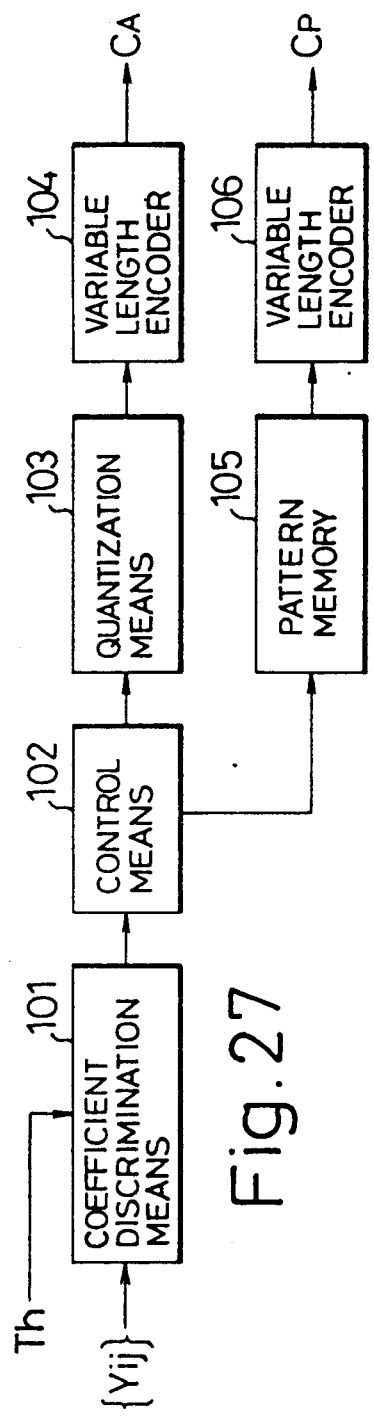
FIGS. 27 and 28 are respectively a block diagram of another embodiment of the system according to the present invention.

According to still another feature of the present invention, there can be provided a picture encoding system which allows two dimensionally arranged pattern of the significant coefficients to be directly encoded into variable length codes, so as to prevent any deterioration in the encoding efficiency due to undesirable arrangement of the significant coefficients, and to still maintain the compression rate to be at a high level. Referring to FIG. 27, this system includes a coefficient discrimination means 101 which compares with the preliminarily set threshold level Th a train of the coefficient signals $\{Yij\}$ which are obtained by subjecting picture element signals corresponding to one of the divided blocks to the orthogonal transform, so that signal components higher than the threshold level Th will be discriminated as the significant coefficient while those lower than Th as insignificant coefficient. For the significant coefficients, their value will be passed as it is, while the insignificant coefficients are rounded off to be made zero. The significant coefficients are provided through a control means 102 and a quantization means 103 to a variable length encoder 104, where the variable length codes corresponding to quantized indexes are assigned, and compressed amplitude signals CA are provided thereout. At the same time, positional information denoting which positions in the coefficient signal train $\{Yij\}$ are occupied by the significant coefficients are stored in a pattern memory 105. As the information on all components of the coefficient signal train $\{Yij\}$ is thus stored in the pattern memory 105, the two dimensionally arranged pattern of the significant coefficients included in the transform coefficient train $\{Yij\}$ which are to be encoded is stored. That is, in the pattern memory 105, a disposition pattern showing which positions in the matrix are occupied by the significant or insignificant coefficients is to be stored, irrespective of the value of the significant coefficients.

In a variable length encoder 106, there is provided a table in which the disposition pattern of the binary information in the matrix and the variable length codes are disposed to correspond to each other in one to one relationship, so that, when the disposition pattern of the significant coefficients corresponding to one block of the original picture is stored in the pattern memory 105, the pattern will be compared with the table to obtain the variable length codes corresponding thereto. That is, when the transform coefficient train $\{Yij\}$ are of $4\times4$ matrix, there are included 16 components which are the binary information of the coefficients either significant or insignificant, and eventually there exist $2^{16}$ pieces of the disposition pattern. Accordingly, the variable length encoder 106 is storing in the table $2^{16}$ disposition patterns, contents in the table are searched to locate one of the patterns which corresponds to that stored in the pattern memory 105, and compressed pattern codes are obtained as the variable length codes.

Figure 28:
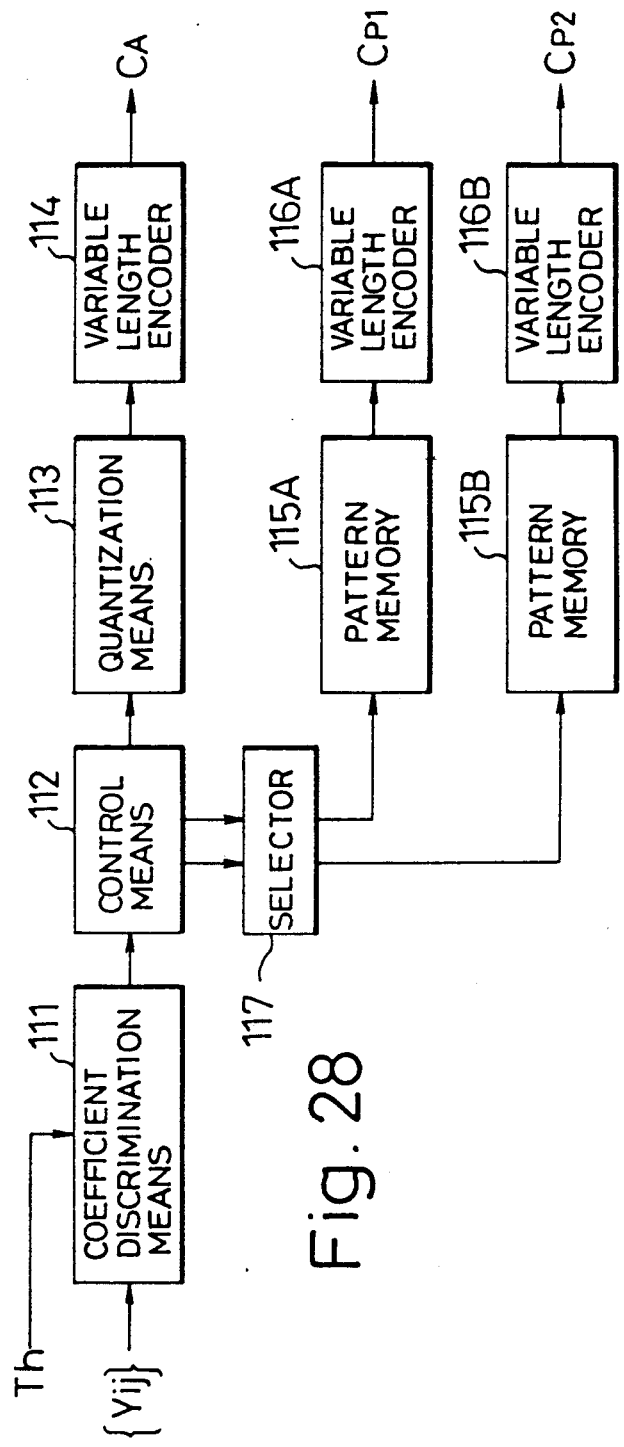

Referring next to FIG. 28, there is provided a system which is capable of reducing the memory capacity in contrast to the embodiment of FIG. 27. In the FIG. 27 embodiment, the variable length codes are assigned to all of the disposition pattern of the significant coefficients in respect of the block to be encoded and, in the case where the transform coefficient train $\{Yij\}$ are of the $4\times4$ matrix, the foregoing table of the variable length encoder 106 is required to have $2^{16}$ pairs of the disposition pattern and the variable length codes, and the memory capacity has to be made relatively large. In the present embodiment of FIG. 28, therefore, the transform coefficient train $\{Yij\}$ are divided into two zones Z1 and Z2, as will be clear when FIG. 29 is also referred to, and the disposition pattern table is provided for each of these zones Z1 and Z2. Provided that the transform coefficient train $\{Yij\}$ are, for example, in the $4\times4$ matrix, the zones Z1 and Z2 are made to respectively have 8 elements, then the pair of the pattern and variable length codes will be $2^8$ in the respective tables, and the pair number will be retained to be only $2^8 \times 2 = 2^9$ in total for the both zones, whereby the memory capacity can be minimized to a large extent and required search time throughout the tables can be shortened. In this case, the corresponding relationship between the disposition pattern and the variable length code will be as shown, for example, in FIG. 30. In the disposition patterns shown here, "0" denotes the insignificant coefficient while "1" denotes the significant coefficient, and it is so set that, when the first zone Z1 is of the insignificant coefficients for all components, the variable length code will be "000" but, when the significant coefficient is present only at upper left corner, the variable length code will be "101". Naturally, the length of the variable length code varies depending on the position of the significant coefficient, and the coefficient of 8 figures or so allows the disposition pattern to be easily coded.

In the present invention, the positional information divided as passed through a control means 112 will be separated through a selector 117, into the components corresponding to the respective zones Z1 and Z2, and the separated components are stored respectively in each of pattern memories 115A and 115B for each of the zones Z1 and Z2. These positional information stored in the pattern memories 115A and 115B are coded respectively at variable length encoders 116A and 116B in respect of each of the zones Z1 and Z2, and compressed pattern codes CP1 and CP2 are obtained consequently as the variable length codes for each of the zones Z1 and Z2. Here, the pattern memories 115A and 115B as well as the variable length encoders 116A and 116B are provided in two series arrangement, but they may be provided in a single series only. In this event of the single series, they may be so employed as to commonly utilize the pattern table, by taking into consideration the dividing aspect of the zones Z1 and Z2 and employing the pattern memories 115A and 115B respectively for a time deviated from each other with respect to the both zones Z1 and Z2. While in the foregoing the signal train {Yij} have been made as to be in the 4×4 matrix, it is possible to enlarge the matrix size further, in the event of which the divided zone number is increased so that variable length codes can be assigned to the patterns without enlarging the pattern table.

Figure 31:
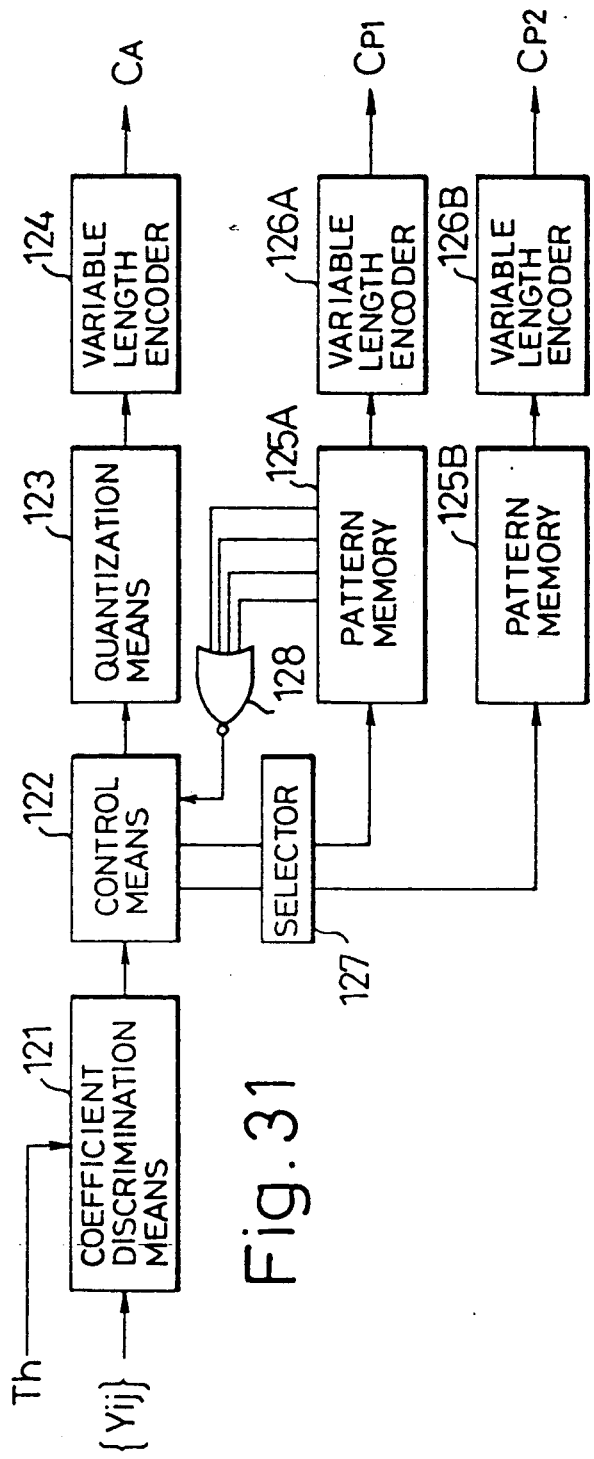
FIG. 31 shows in a block diagram still another embodiment of the present invention.

In the event where the coefficient signal train {Yij} corresponding to the actual picture are practically divided into such two zones as shown in FIG. 29, it often happens that the second zone Z2 is of the insignificant coefficient. Accordingly, as shown in FIG. 32, four components a-d in the zone Z1 and disposed along the boundary with respect to the other zone Z2 are inspected and, when all of these components are of the insignificant, components of the other zone Z2 are regarded as being all of the insignificant coefficient, and no encoding is carried out for this zone Z2, so that the compression efficiency can be elevated. As exemplified in FIG. 31, therefore, another embodiment employs, in contrast to the embodiment of FIG. 28, a NOR circuit 128 is added to a pattern memory 125A corresponding to the first zone Z1 to have a NOT of logic sum of the boundary components a-d in the first zone Z1 detected. In the case when even only one of the components a-d is the significant coefficient "H", then the output level of the NOR circuit 128 will be "L" but, when all of the components a-d are the insignificant coefficient "L", the NOR circuit output level will be "H". It is made possible, therefore, to detect by means of the output level of the NOR circuit 128 whether or not the significant coefficient is included in the boundary components a-d in the zone Z1, so that, when a control means 122 is made to operate as controlled by the output of the NOR circuit 128, the encoding of the block of the original picture can be completed without carrying out any encoding with respect to the second zone Z2 in the event where the boundary components a-d in the first zone Z1 are of the insignificant coefficient. In the present instance of FIG. 31, other arrangements are the same as those in FIG. 29, and constituents having the same function are denoted by the same reference numerals as used in FIG. 29 but as added by 10.

Figure 33:
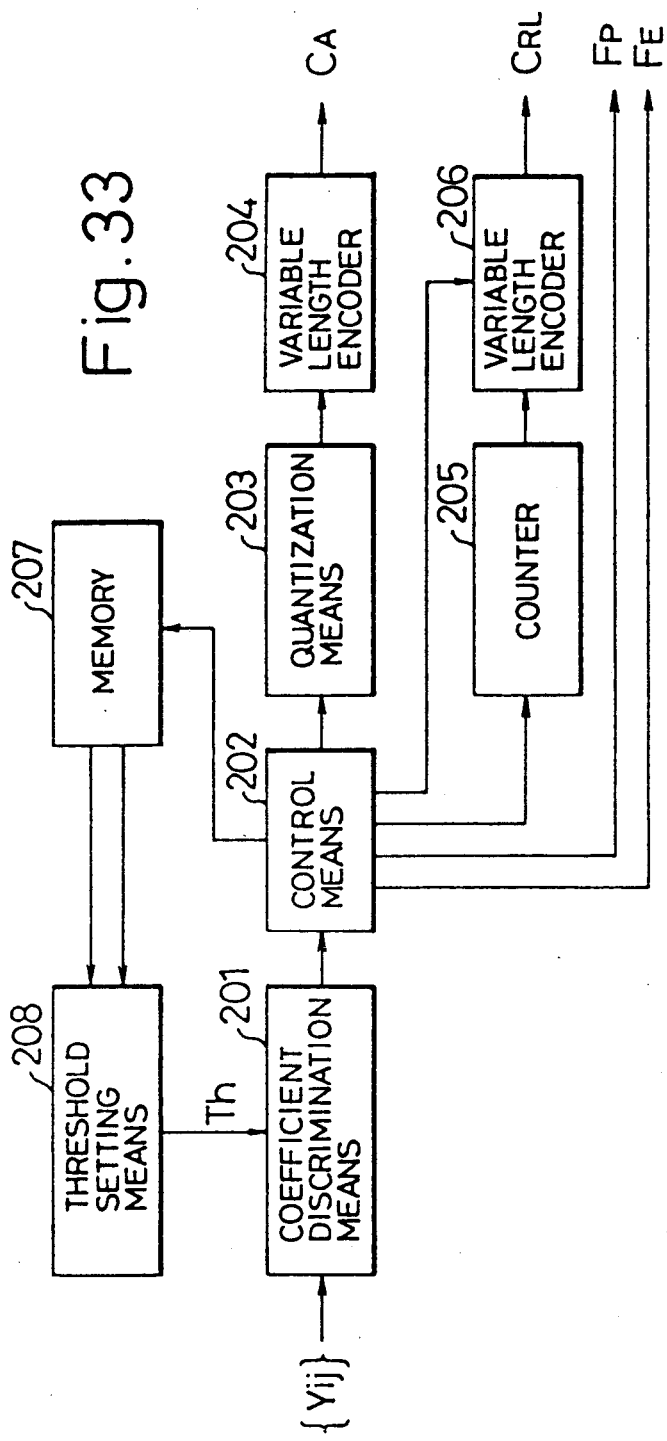
FIG. 33 shows in a block diagram a still further embodiment of the system according to the present invention.

According to still another feature of the present invention, there is provided a system which can reduce any distortion generated when any variation in shading or gradation level of the original picture is relatively gradual, due to that the blocks of only the insignificant coefficients continue and the extrapolation prediction errors are operated. As will be appreciated in FIG. 33 showing an embodiment of this feature, the respective components of the coefficient signal train {Yij} obtained by orthogonally transforming the error signal train which are the difference between the picture element signal train corresponding to the original picture block and the prediction signal train of the extrapolational prediction are compared with the threshold level Th at a coefficient discrimination means 201 so that, when the components are of a level higher than the threshold level Th, they will be discriminated as to be the significant coefficient but, when lower than Th, to be the insignificant coefficient. The threshold level Th is made variable on the basis of any specific condition.

Figure 34:
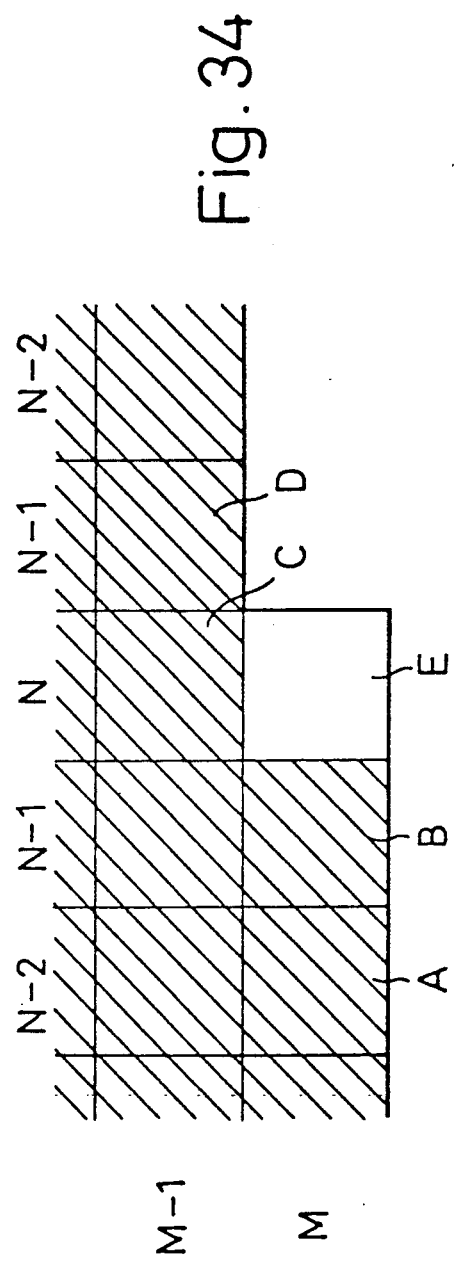
FIG. 34 is an explanatory view for the theory of the system of FIG. 33.

Referring to basic principle for setting the foregoing threshold level Th with reference to FIG. 34 showing certain blocks of the picture elements, the blocks shown as hatched here are the ones which have already been encoded. Provided now that a block E is the object to be encoded next, the blocks B and C which are adjacent this block E will be referred to. For these blocks B and C, whether or not the components in these blocks B and C include the significant coefficient is made to be the setting reference for the threshold level, and the block containing the significant coefficient is regarded as a significant block whereas any block consisting only of the insignificant coefficient is regarded as an insignificant block. When both of these blocks are the insignificant blocks, the threshold level Th is lowered to a predetermined level, in contrast to the case when one previous block, here the block B, has been encoded. When the threshold level Th is lowered, occurrence frequency of the insignificant coefficient at a coefficient discrimination means 201 is reduced, and it is made possible to restrain continuous generation of the insignificant blocks. Upon this processing of the arbitrary lowering of the threshold level Th, on the other hand, the occurrence frequency of the significant blocks increases so as to lower the compression efficiency. Therefore, when the blocks B and C adjacent the block E to be encoded here are both the significant block, the threshold level Th is raised to a predetermined level as compared with the case where one previous block, that is, the block B has been encoded. If at this time either one of the blocks B and C is significant, the threshold level Th is kept not to vary. Since the threshold level Th is thus adjusted in conformity to the blocks B and C adjacent the block E to be encoded, it becomes possible to attain the optimum relationship between the degree of the distortion and the compression efficiency, by properly setting the adjusting amount of the threshold level Th to prevent the insignificant blocks from continuing and the compression efficiency from extremely lowering. It may be also possible to attain the same effect by adjusting the threshold level Th on the basis of the information on other neighboring blocks A and D, not only the blocks B and C immediately adjacent the block E to be encoded.

Referring again to FIG. 33, the threshold level Th is adjusted, more concretely, by means of a memory 207 and a threshold setting means 208. That is, through the coefficient discrimination means 201 and a control means 202, it is determined whether or not the significant coefficient is included in the block, and the memory 207 is to store this block as being an insignificant block when no significant coefficient is included at all in the block or as being a significant block when even one significant coefficient is present. In the memory 207, therefore, there are stored the positional information relating to the blocks disposed adjacent the particular block for the encoding, the positional information being shown by means of memory addresses in the memory 207, as well as the information whether or not the blocks are the significant or insignificant block. In the threshold setting means 208, required information will be read out of the memory 207 in accordance with the position of the block for the encoding, and the threshold level Th for the coefficient discrimination means 201 is set, whereby the compressed amplitude code CA corresponding to brightness information, a compressed run-length code CRL and so on are provided as outputs, the code CRL being provided through a counter 205. As the encoding of one block is completed, the information on the significance and insignificance information of the particular block are stored in the memory 207, and the encoding proceeds to a next block.

Figure 35:
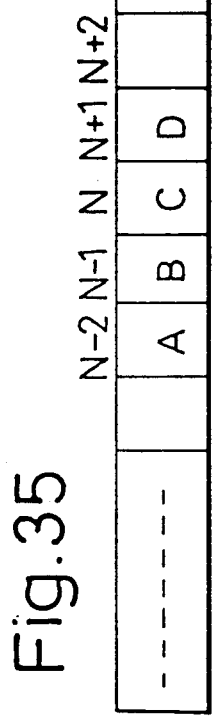
FIGS. 35 and 36 are explanatory views for the operation of memories in the system of FIG. 33.
Figure 36:
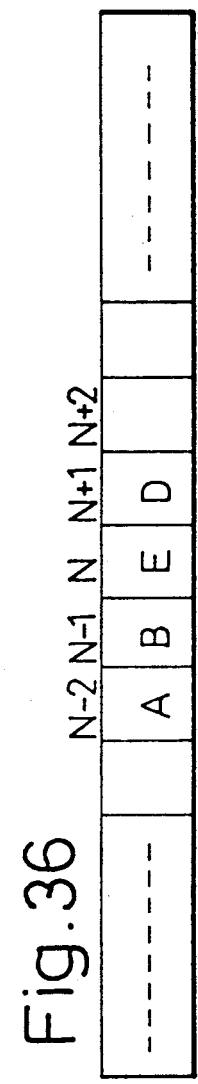

When the memory 207 is to store the respective information on all of the respective blocks of the original picture, then the storing capacity of the memory 207 has to be made large enough therefor. In the present embodiment, too, the blocks are to be divided in the same matrix formation as in the foregoing embodiments. It should be assumed here that the block for the encoding here is the block E positioned on line M and column N as in FIG. 34. The memory 207 is dimensioned to be capable of storing the discrimination information for the blocks on one line, so that the information on the line M are stored from an address 1 to an address (N−1), and the information on line (M−1) are stored in an address N and followings (see FIGS. 35 and 36). Accordingly, the information on the blocks A-D shown in FIG. 34 are to be stored in the memory 207, as shown in FIG. 35, at addresses (N−2) to (N+1). After completion of the encoding of the block E with the required information employed in this manner, the information at the address N are rewritten from the information of the block C to those of the block E, as shown in FIG. 36, so as to be contributive to the encoding of a next block. By sequentially renewing the information thus stored, therefore, it becomes possible to sequentially obtain the setting information of the threshold level Th in respect of the whole picture only by means of the memory 207 capable of storing the information for one line.

In the embodiment of FIG. 33, all other arrangements are the same as those in, for example, FIG. 27, and the same constituents as in FIG. 27 are denoted by the same reference numerals as those employed in FIG. 27 but as added by 100.

Referring now to FIG. 37, there is shown still another embodiment of the picture encoding system wherein the foregoing threshold level is made smaller for low frequency component than high frequency component, and a quantizing step width is also made smaller for the low frequency component than that for the high frequency component, so that the continuously occurring frequency of the insignificant blocks can be reduced. In this case, the respective components of the coefficient signal train {Yij} obtained in the same manner as in the embodiment of FIG. 27 are compared with the threshold level set by a coefficient discrimination means 301 for the discrimination of the component above the threshold level to be the significant coefficient and any other component below the level to be the insignificant coefficient. In setting the threshold level, the transform coefficient Yij corresponding to the low frequency component in the transform coefficient train {Yij} (in FIG. 38, Y11 and the transform coefficients adjacent Y11) is provided into a control means 302, and then the threshold level "t" is selected by a selector 307. Here the threshold level is set in a relation of Th>t. Therefore, it becomes more often that the lower frequency component is discriminated to be the significant coefficient. The control means 302 provides its output also to a quantization means 303, the quantizing step width of the quantization means 303 here being set by another selector 308 which, similarly to the foregoing selector 307, selects a quantizing step width d for the low frequency component in the transform coefficient train {Yij} but a quantizing step width D for high frequency component, and a relationship D>d is satisfied. Accordingly, the low frequency components will allow a more precise quantization.

As in the above, the transform coefficient train {Yij} are separated into the significant and insignificant coefficients, the significant coefficients are quantized with the same arrangement as in FIG. 33 and thereafter provided out of a variable length encoder 304 as a compressed amplitude code CA corresponding to quantized value, while the insignificant coefficients are counted at a counter 305 in respect of their run-length and thereafter provided out of another variable length encoder 306 as a compressed run-length code CRL. Since the threshold level is set to be Th>t and the quantizing step width to be D>d, here, the insignificant blocks are prevented from continuing even in a zone of a gentle shading variation, the zone involving much more low frequency components, whereby any prediction error can be prevented from being accumulated and the shading level in the block can be precisely reproduced, so that any generation of distortion due to abrupt variation in the shading level at boundary portions of the blocks can be restrained.

Figure 39:
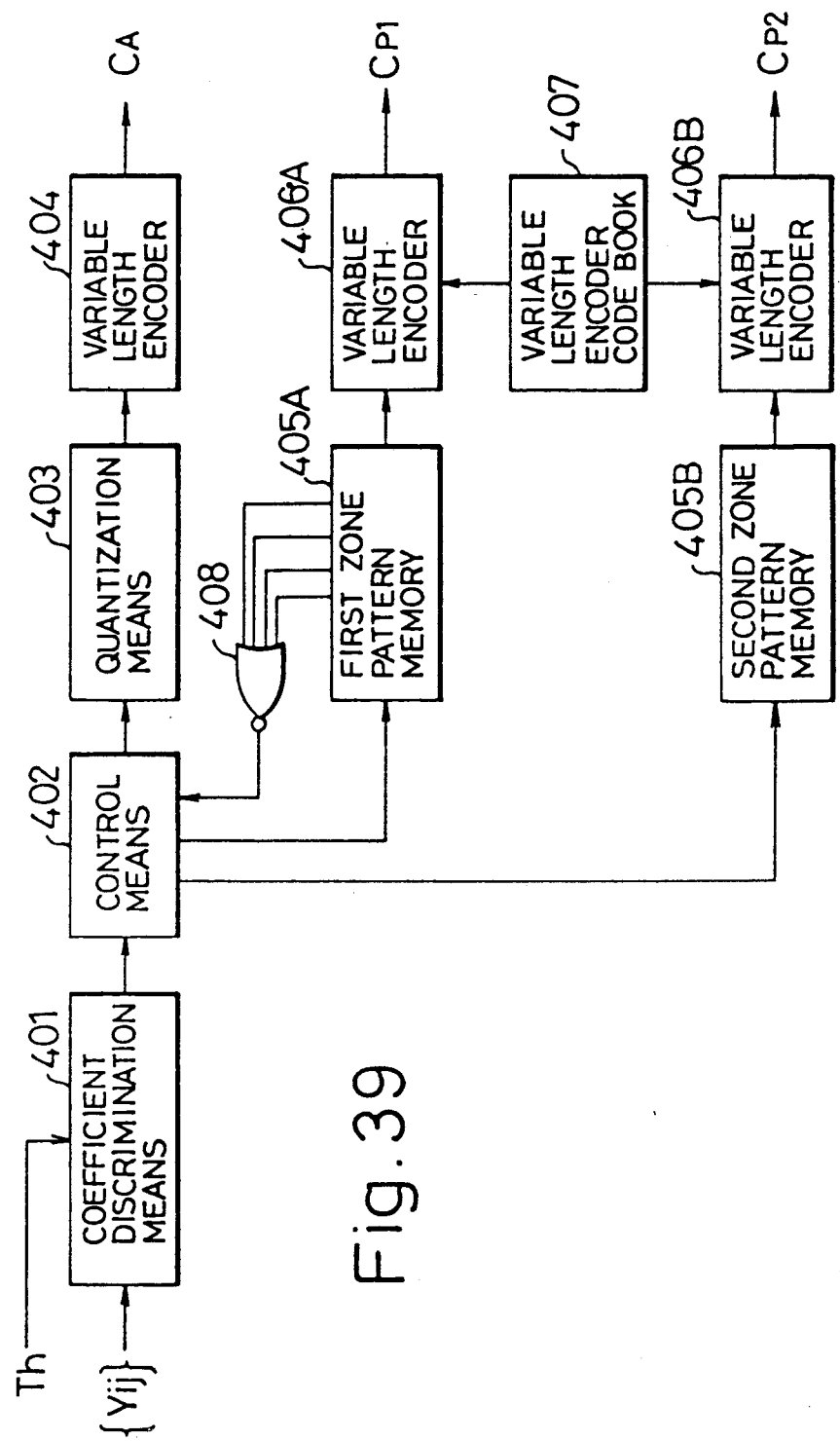
FIG. 39 is a block diagram showing still another embodiment of the system according to the present invention.
Figure 40:
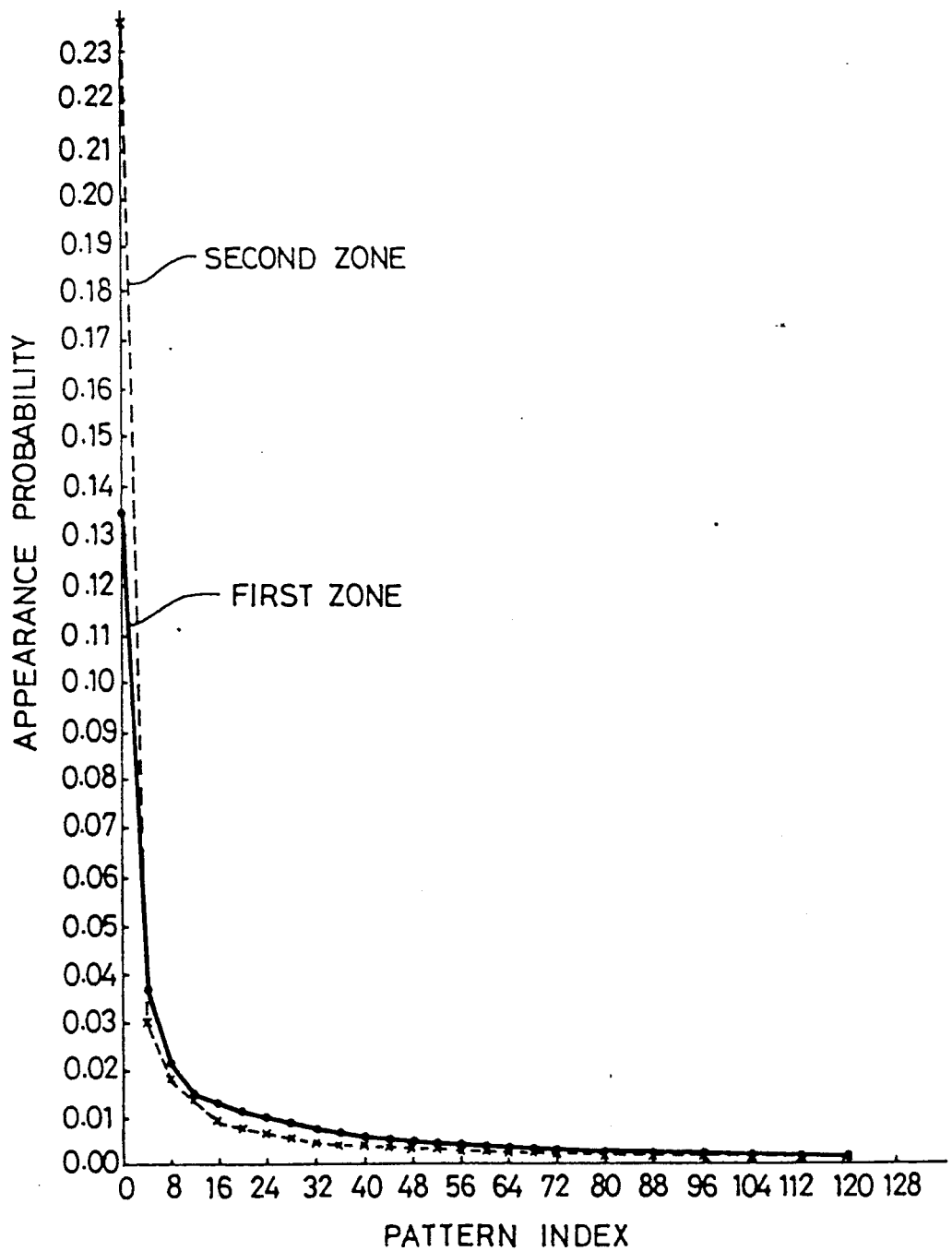
FIG. 40 is a diagram for explaining the operation of memories in the system of FIG. 39.

According to a further feature of the present invention, there is provided a system which minimizes the storing capacity by means of a common use of a single code book for the both variable length encoders, in executing the discrimination of the significant and insignificant coefficients with the blocks divided as shown in FIG. 29 into the first and second zones. Referring to FIG. 39 showing an embodiment of this feature, the present embodiment is comparable with that of FIG. 31 except for that a variable length encoder code book 407 is provided with respect to a pair of variable length encoders 406A and 406B, and other arrangements are substantially the same, employing the same constituents as those in FIG. 31 which are denoted by the same reference numerals as employed in FIG. 31 but as added by 280. In the present instance, pattern memories 405A and 405B are storing the disposition patterns of the significant coefficients respectively in the first and second zones, and provide thereout indexes respectively corresponding one to one to the respective disposition patterns. The variable length encoders 406A and 406B are to refer to the variable length encoder code book 407 in view of the pattern indexes of the first and second zones received from the pattern memories 405A and 405B and provide as their output variable length code signals CP1 and CP2 corresponding to the pattern indexes. In the present instance, it is taken into account that appearance probability of the pattern indexes of the first and second zones shows the similarity in the distribution to computer simulation results, as seen in FIG. 40, and costs for the hardware can be reduced by means of the common variable length encoder code book 407 with respect to the both zones.

Referring to a method of preparing the code book common to the first and second zones, the appearance probability P1(Si) of P2(Si) of the pattern indexes is calculated for each of the zones, a weight is given to the probability in accordance with the encoding frequency of the respective zones, and the code book can be prepared by means of a following formula on the basis of the calculated appearance probability:

$$P1+2(Si) = w1 \cdot P1(Si) + w2 P2(Si)$$

wherein a suffix "i" is the pattern index, and the pattern indexes are assumed to be arranged in the sequence of confirmation of their appearance, while w1 and w2 are weight coefficients which are set to be w1>w2 here.

Figure 41:
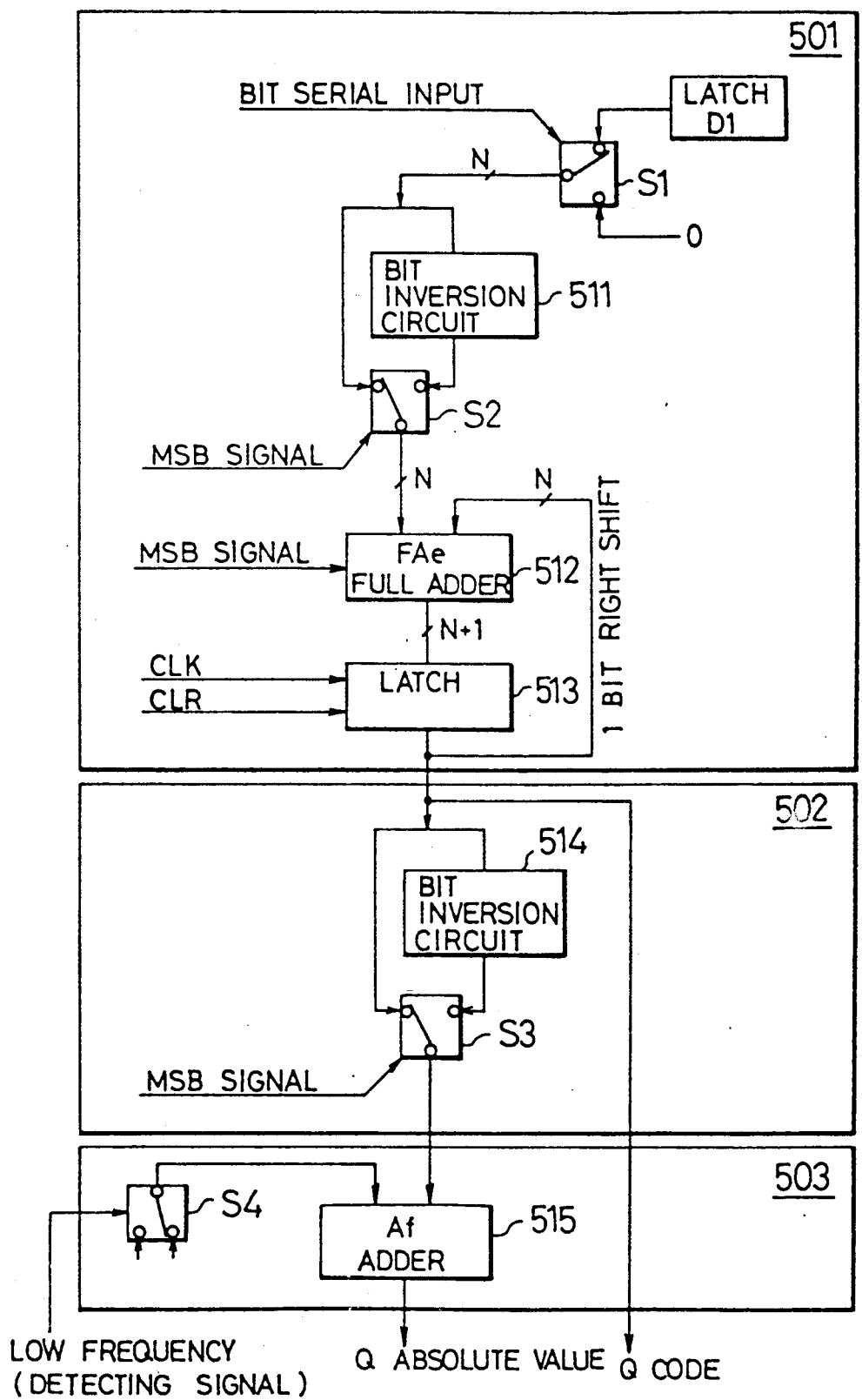
FIG. 41 shows in a circuit diagram still another embodiment of the system according to the present invention.

According to still another feature of the present invention, there can be provided a picture encoding system in which the quantization means allows the multiplication performed by the accumulative addition of the serial inputs as they stand without transforming the serial inputs to the parallel inputs so that the means can be simplified in the structure. Referring to FIG. 41, there is shown a hardware of the present embodiment, which comprises an accumulative adding means 501, a bit inversion means 502 and an offset addition means 503. In the present instance, a bit serial input is provided to a change-over part of a switch S1 in synchronism with a clock signal CLK. To the switch S1 per se, an input from a latch D1 storing an inverse number $A = 1/Th$ of the threshold level Th as well as a value zero are provided so that, when the serial input is "1", the value A will be selected while the value "0" will be selected when the serial input is zero. Thus selected output of the switch S1 as well as a bit inversion value of all bits of the selected output which are inverted by a bit inversion circuit 511 are provided into a switch S2 which is receiving an MSB signal, so that the switch S2 will select the bit inversion value of the circuit 511 when the MSB signal is "1" but the output of the switch S2 when the MSB signal is "0". The MSB signal employed here will be such a signal which is "1" only when MSB bit of the bit serial input is "1" but is "0" in all other events.

The thus selected output of the switch S2 is provided into a full adder FAe 512, where a sum of the output of the switch S2 and an output of a latch 513 is obtained, while the MSB signal is provided to the full adder FAe 512. First, the latch 513 is cleared by a clock signal CLK before the bit serial input is received, so as to be "0". Next, the full adder FAe 512 receives the value A when the bit serial input is "1" or zero value when the particular input is "0", upon which contents of the latch 513 will be an output of the zero or A value of the full adder FAe 512 depending on the MSB signal. Then, the output of the full adder FAe 512 can be held by the latch 513 responsive to the clock signal CLK.

Upon receipt of a second bit serial input, the same is provided to the full adder FAe 512 but the output of the latch 513 is caused at this time to shift 1 bit right so that, if the output of the latch 513 would be Do, the input to the full adder FAe 512 will be Do/2. Assuming here that the all bit number of the bit serial input is M, the bit number of the latch D1 is N, an i-th bit serial input is Di, and the output of the latch 513 holding calculation result of the full adder FAe 512 is Do, the above operation is represented as follows:

$$\begin{cases} Di = bi \cdot A + (Di - \frac{1}{2}) \text{ (when } i = 1 \text{ to } M - 1) \\ Do = 0 \end{cases}$$

When the MSB signal is "1", the input to the full adder FAe 512 will be $(DM-1)/2$ and $(-A-1)$ so that:

$$DM = -bM \cdot A + (DM-1)/2$$

Solving this:

$$DM = 1/2 \left( \sum_{i=1}^{M-1} bi \cdot A \cdot 2^{i-1} - bM \cdot A \cdot 2^{M-1} \right)$$
$$= 1/(2M - 1) \cdot A \cdot \left( \sum_{i=1}^{M-1} bi \cdot 2^{i-1} - bM \cdot 2^{M-1} \right)$$

Since, in the above, $$\left( \sum_{i=1}^{M-1} bi \cdot 2^{i-1} - bM \cdot 2^{M-1} \right)$$

in the value I itself representing the bit serial input with the complement number of 2, it becomes that $$DM = 1/(2^{M-1}) \cdot A \cdot I$$

In other words, the output of the latch 513 after receipt of all the bit serial inputs is of a quotient of A·I divided by $(2^{M-1})$.

Next, an absolute value of the accumulative adding means 501 is obtained at the bit inversion means 502. In the present instance, further processing is carried out not by means of the complement expression of 2 but by means of a sum of the code and absolute value so that, as the MSB signal among the all bit outputs of the accumulative adding means 501 is of the code bit, the signal can be provided out of the particular means as a Q code representing the quantization result. The output of N-1 bit from the latch 513 is provided directly and through a bit inversion circuit 514 to a switch S3 in the bit inversion means 502. In this case, the input to the bit inversion circuit 514 is the quotient of the A·I product divided by $(2^{M-1})$, any error involved in which will be at most about $1/(2^{M-1})$ and may be of a level negligible if the M value is large. In the present embodiment, therefore, all bits are simply inversed to obtain a negative number. Accompanying this, the switch S3 receives inputs of $(1/2^{M-1}) \cdot A \cdot I$ and $-(1/2^{M-1}) \cdot A \cdot I$, and the switch S3 selects $-(1/2^{M-1}) \cdot A \cdot I$ when the MSB signal is "1" but $(1/2^{M-1}) \cdot A \cdot I$ when the signal is "0". The value A is an inverse number of the threshold level Th and is a positive number, and the MSB signal is the code itself of A·I. Accordingly, an output of the bit inversion means 502 will be $(1/2^{M-1}) \cdot |A \cdot I|$.

Figure 42:
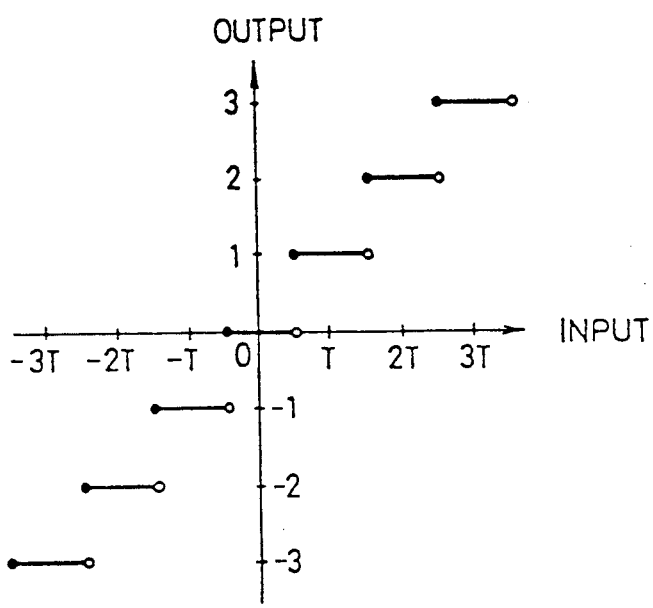
FIGS. 42 and 43 are diagrams for explaining the quantization carried out in the system of FIG. 41.
Figure 43:
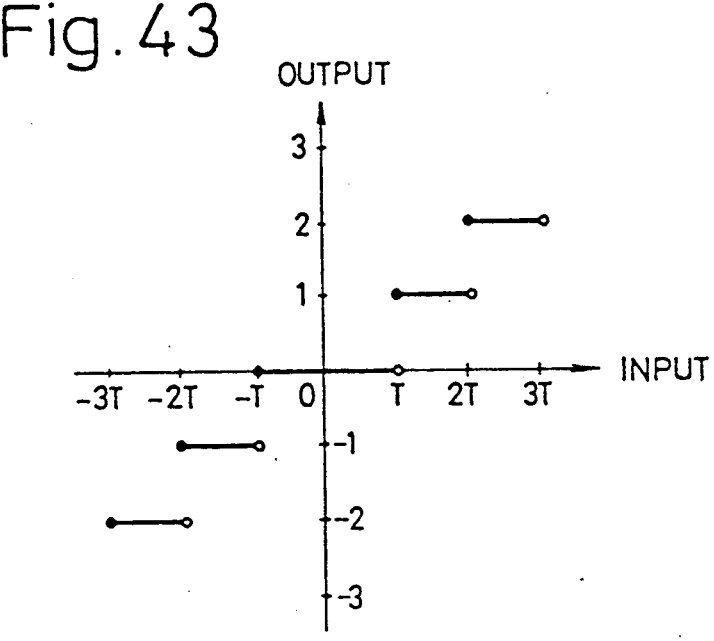

In the offset adding means 503, next, a switch S4 selects an offset signal when the detected low frequency component signal is "1", that is, the output of the bit inversion means 502 is the low frequency component, but the zero value when the output is of any others. The offset signal employed here will be, for example, $\frac{1}{2}$ or the like. Here, an adder Af 515 adds the output of the switch S4 to the output of the bit inversion means 502, and this adder Af 515 provides either $$(1/2^{M-1}) \cdot (A \cdot |I| \cdot \frac{1}{2})$$

for the low frequency component, or $$(1/2^{M-1}) \cdot (A \cdot |I|)$$

for the high frequency component, as the absolute value of Q. Here, a code of Q is separately provided out and, taking an advantage that $A = 1/Th$, there is provided either $\theta = (1/2^{M-1}) \cdot \text{sgn}(I) \cdot \{|I|/Th + \frac{1}{2}\}$ for the low frequency component, or $\theta = (1/2^{M-1}) \cdot \text{sgn}(I) \cdot (|I|/Th)$ for the high frequency component, eventually with respect to the bit serial input, in a numerial expression of the code plus the absolute value. It should be appreciated that, while this processing is similar to the rounding off of the M−1 bit upon the quantization, the processing at the bit inversion means 502 for the negative number is an approximation processing, so that the quantization according to the present embodiment in practice will be as shown in FIG. 42 for the low frequency component or as in FIG. 43 for the high frequency component.

We claim as our invention:

1. A picture encoding system wherein the picture is divided into blocks, having a plurality of picture elements, comprising:
   a prediction means for predicting picture element values within the blocks, obtaining predicted values, and thereafter obtaining prediction error signals based on differences between the predicted values and true values;
   a discrete sine transform means for carrying out a discrete sine transform with the obtained prediction error signals to obtain transform coefficients;
   a quantization means for quantizing the obtained transform coefficients and obtaining quantized indexes;
   an encoding means for encoding the obtained quantized indexes;
   an inverse quantization means for inversely quantizing the quantized indexes to reproduce the transform coefficients;
   an inverse discrete sine transform means for carrying out an inverse discrete sine transform with the reproduced transform coefficients to reproduce the transform coefficients;
   a reproduction means for reproducing the picture element values within the block by adding the reproduced prediction error signals to the predicted values;
   said prediction means obtaining, through extrapolation prediction, predicted element values for each block to be encoded by employing part of the reproduced picture element values of blocks adjacent to the blocks to be encoded.

2. A system according to claim 1, wherein said quantization means is formed to have an input signal of a complementary representation of "2" and an ouput signal carrying an absolute value representation of data to be quantized.

3. A system according to claim 1, wherein said prediction means employs said picture element values of adjacent blocks which have been previously encoded and reproduced, as initial values for said prediction, when encoding top edge and left side edge positioned blocks.

4. A system according to claim 1, wherein said discrete sine transform means and inverse discrete sine transform means carry out said discrete sine transform and inverse discrete sine transform in two dimensional manner.

5. A system according to claim 4, wherein said discrete sine transform means includes a memory for storing said prediction error signals in respect of one of said blocks, a row transformer including accumulative adders corresponding in number to rows of a transforming matrix and capable of obtaining a one dimensional transform corresponding to one wave number which is a change-over of the row in the matrix, and a column transformer including accumulative adders corresponding in number to columns of said matrix and having different row components; said two dimensional discrete sine transform is carried out by reading prediction error signals out of said memory sequentially corresponding times to the number of columns in the block and changing over every time the row in the matrix of the row tramsformer.

6. A system according to claim 4, wherein said discrete sine transform means and said inverse discrete sine transform means comprise respectively a plurality of over transformers for carrting out a one dimensional discrete sine transform, a plurality of column transformers of the same arrangement as said row transformers, and means for carrying out a row-column exchange by changing over accumulating direction in vertical and horizontal directions for every block so that said two dimensional discrete sine transform and said two dimensional inverse discrete sine transform will be performed by providing data on each row to said transformers in parallel and sequential manner.

7. A system according to claim 1, wherein said discrete sine transform means employs as said discrete sine transform an integer orthogonal transform which approximates the discrete sine transform with an orthogonal relationship maintained, and has an integer number of transform matrix components.

8. A system according to claim 7, wherein said integer orthogonal transform is of a transform matrix:

$$\frac{1}{\sqrt{147}} \begin{bmatrix} 3 & 5 & 7 & 8 \\ 7 & 7 & 0 & -7 \\ 8 & -3 & -7 & 5 \\ 5 & -8 & 7 & -3 \end{bmatrix}$$

9. A system according to claim 1, wherein said quantization means compares said transform coefficients with a predetermined threshold value, and quantizes the transform coefficients which are larger than said threshold value only as significant coefficients, while other transform coefficients smaller than the threshold value are rounded off to be zero as insignificant coefficients.

10. A system according to claim 9, said quantization means causes asid threshold value to vary in response to discrimination of said significant and insignificant coefficients for a plurality of said blocks adjacent said block being encoded.

11. A system according to claim 9, wherein said quantization means sets said threshold value to be lower for quantizing said transform coefficients corresponding to low frequency components in a train of the transform coefficients than that for the coefficients corresponding to high frequency components in said train.

12. A system according to claim 9, wherein said quantization means quantizes said transform coefficients corresponding to low frequency components in a train of the coefficients with a quantizing step width set to be smaller than that for the coefficients corresponding to high frequency components in said train.

13. A system according to claim 9, wherein said encoding means encodes said quantized indexes of said significant coefficients and positions in said block of the significant coefficients.

14. A system according to claim 13, wherein said encoding means carries out said encoding of said positions in said block of said significant coefficients by assigning a variable length code to the positions on the basis of tables corresponding to respective disposition patterns of said significant coefficients in each of said blocks in a one to one relationship.

15. A system according to claim 14, wherein said encoding means carries out said encoding by dividing each of said blocks at least into two zones, and dividing said disposition patterns of said significant coefficients into at least two groups.

16. A system according to claim 15, wherein said encoding means encodes said disposition patterns of said significant coefficients in a train of said transform coefficients within each of said divided zones by reference to a variable code table common to the respective zones.

17. A system according to claim 1, wherein said prediction, discrete sine transform, quantization, inverse quantization, inverse discrete sine transform and reproduction means are operated in a pipe-line arrangement, with said blocks scanned sequentially in diagonal direction for their pipe-line processing.

18. A system according to claim 1, wherein said prediction, discrete sine transform, quantization, inverse quantization, inverse discrete sine transform and reproduction means are arranged for pipe-line processing of said blocks, said pipe-line processing being carried out sequentially with respect to each of said blocks taken out of respective zones in said original picture, and being continued for the blocks in other zones until said picture element values in the blocks of one of the zones are reproduced and prediction of one of the blocks to be next encoded becomes possible.

* * * * *

UNITED STATES PATENT AND TRADEMARK OFFICE
CERTIFICATE OF CORRECTION

PATENT NO. : 5,054,103
DATED : October 1, 1991
INVENTOR(S) : Yasuda et al.

It is certified that error appears in the above-identified patent and that said Letters Patent is hereby corrected as shown below:

Claim 6, column 26, line 18, change "over" to --row--;

line 18, change "carrting" to --carrying--.

Claim 10, column 26, line 51, after "9," insert --wherein--;

line 52, change "asid" to --said--.

Claim 16, column 28, line 1, after "variable" insert --length--.

Signed and Sealed this

Twenty-ninth Day of June, 1993

Attest:

MICHAEL K. KIRK

Attesting Officer      Acting Commissioner of Patents and Trademarks